US012605294B2

(12) United States Patent
Tumavich et al.

(10) Patent No.: US 12,605,294 B2
(45) Date of Patent: Apr. 21, 2026

(54) SUPPORT APPARATUS FOR BARIATRIC PERSON

(71) Applicant: Stryker Corporation, Kalamazoo, MI (US)

(72) Inventors: James Tumavich, Kalamazoo, MI (US); Ryan Ross, New Carlisle, IN (US); Robert G. Cox, Kalamazoo, MI (US)

(73) Assignee: Stryker Corporation, Portage, MI (US)

( * ) Notice: Subject to any disclaimer, the term of this patent is extended or adjusted under 35 U.S.C. 154(b) by 339 days.

(21) Appl. No.: 17/954,504

(22) Filed: Sep. 28, 2022

(65) Prior Publication Data

US 2023/0013742 A1 Jan. 19, 2023

Related U.S. Application Data

(63) Continuation of application No. 16/916,898, filed on Jun. 30, 2020, now Pat. No. 11,484,449.
(Continued)

(51) Int. Cl.

| | |
|---|---|
| ***A61G 7/002*** | (2006.01) |
| ***A61G 7/05*** | (2006.01) |
| ***A61G 7/10*** | (2006.01) |

(52) U.S. Cl.
CPC .......... *A61G 7/002* (2013.01); *A61G 7/0525* (2013.01); *A61G 7/1021* (2013.01); *A61G 2200/16* (2013.01); *A61G 2200/327* (2013.01)

(58) Field of Classification Search
CPC .... A61G 7/002; A61G 7/0525; A61G 7/1021; A61G 2200/16; A61G 2200/327;
(Continued)

(56) References Cited

U.S. PATENT DOCUMENTS 3,822,425 A 7/1974 Scales
4,768,249 A 9/1988 Goodwin
(Continued)

FOREIGN PATENT DOCUMENTS

EP 1 011 391 6/2000
EP 1 985 273 7/2014
(Continued)

OTHER PUBLICATIONS

"Sleeve." Cambridge Dictionary, definition, https://dictionary.cambridge.org/us/dictionary/english/sleeve.*
(Continued)

*Primary Examiner* — Madison Emanski
(74) *Attorney, Agent, or Firm* — Warner Norcross + Judd LLP

(57) ABSTRACT

A support apparatus for a person includes a main cushion having a bottom surface, a top surface to form a support surface for a person supported on the main cushion, and a length having a perimeter that has longitudinal and lateral sides extending around the perimeter. In addition, the support apparatus has at least one sleeve located along one of the sides of the man cushion. The sleeve is configured between a stowed state, where the sleeve is closely adjacent to the one side, and a deployed state, where the sleeve forms an extension of the top surface of the main cushion to thereby increase the width or the length of the support surface.

41 Claims, 16 Drawing Sheets

Related U.S. Application Data

(60) Provisional application No. 62/886,096, filed on Aug. 13, 2019.

(58) Field of Classification Search
CPC ...... A61G 7/012; A61G 7/0514; A61G 7/015; A61G 7/1026; A61G 7/05769; A61G 7/05; A61G 7/0755; A61G 2203/20; A61G 7/0524; A61G 13/0009; A61G 7/005; A61G 7/018; A61G 7/0528; A61G 7/05792; A61G 2203/34; A61G 2203/40; A61G 7/001; A61G 2203/44; A61G 2203/42; A61G 7/0507; A61G 7/0503; A61G 2203/32; A61G 7/05776; A61G 7/0527; A61G 7/0506; A47C 19/04; A47C 21/08; A47C 27/082; A47C 27/081
USPC ... 5/710, 713, 732, 425, 485, 722, 739, 706, 5/424
See application file for complete search history.

(56) References Cited

U.S. PATENT DOCUMENTS

| | | | | |
|---|---|---|---|---|
| 5,083,332 | A | 1/1992 | Foster et al. | |
| 5,179,744 | A | 1/1993 | Foster et al. | |
| 5,243,721 | A | 9/1993 | Teasdale | |
| 5,421,044 | A | 6/1995 | Steensen | |
| 5,894,966 | A | 4/1999 | Bobey et al. | |
| 5,956,787 | A | 9/1999 | James et al. | |
| 6,021,533 | A | 2/2000 | Ellis et al. | |
| 6,085,372 | A | 7/2000 | James et al. | |
| 6,098,000 | A | 8/2000 | Long et al. | |
| 6,178,578 | B1 | 1/2001 | Soltani et al. | |
| 6,202,672 | B1 | 3/2001 | Ellis et al. | |
| 6,240,584 | B1 | 6/2001 | Perez et al. | |
| 6,243,894 | B1 | 6/2001 | Kosumsuppamala et al. | |
| 6,295,675 | B1 | 10/2001 | Ellis et al. | |
| 6,357,065 | B1 | 3/2002 | Adams | |
| 6,418,579 | B2 | 7/2002 | Perez et al. | |
| 6,427,538 | B1 | 8/2002 | Potter | |
| 6,430,763 | B2 | 8/2002 | Kosumsuppamala et al. | |
| 6,467,113 | B2 | 10/2002 | Ellis et al. | |
| 6,568,013 | B2 | 5/2003 | Perez et al. | |
| 6,668,399 | B2 | 12/2003 | Malstaff et al. | |
| 6,739,001 | B2 * | 5/2004 | Flick | A61G 7/05707 5/710 |
| 6,760,939 | B2 | 7/2004 | Ellis et al. | |
| 6,826,795 | B2 | 12/2004 | Wilkinson | |
| 6,859,961 | B1 | 3/2005 | Barr | |
| 7,028,352 | B2 | 4/2006 | Kramer et al. | |
| 7,028,358 | B2 | 4/2006 | Liu | |
| 7,086,104 | B1 | 8/2006 | Tsay | |
| 7,111,348 | B2 | 9/2006 | Ellis et al. | |
| 7,155,766 | B1 | 1/2007 | Gilchrest, Jr. et al. | |
| 7,225,489 | B1 * | 6/2007 | Frickey | A47C 19/04 5/722 |
| 7,260,860 | B2 | 8/2007 | Chambers et al. | |
| 7,308,725 | B2 | 12/2007 | Cazzini et al. | |
| 7,328,472 | B2 | 2/2008 | Chaffee | |
| 7,353,556 | B2 | 4/2008 | Ellis et al. | |
| 7,363,663 | B2 | 4/2008 | Chambers et al. | |
| 7,380,302 | B2 | 6/2008 | Gilchrest, Jr. et al. | |
| 7,398,573 | B2 | 7/2008 | Ellis et al. | |
| 7,464,425 | B2 | 12/2008 | Chambers et al. | |
| 7,475,440 | B2 | 1/2009 | Chaffee | |
| 7,565,710 | B2 | 7/2009 | Chambers et al. | |
| 7,698,765 | B2 | 4/2010 | Bobey et al. | |
| 7,735,171 | B2 | 6/2010 | Kan | |
| 7,779,496 | B2 | 8/2010 | Crousore et al. | |
| 7,784,131 | B2 | 8/2010 | Genaro et al. | |
| 7,832,039 | B2 | 11/2010 | Chambers et al. | |
| 7,845,032 | B2 | 12/2010 | Chambers et al. | |
| 7,904,977 | B1 | 3/2011 | Singh | |
| 7,971,300 | B2 | 7/2011 | Wilker, Jr. | |
| 8,122,545 | B2 | 2/2012 | Wilkinson | |
| 8,122,546 | B2 | 2/2012 | Chambers et al. | |
| 8,146,191 | B2 | 4/2012 | Bobey et al. | |
| 8,171,588 | B2 | 5/2012 | Chambers et al. | |
| 8,225,444 | B2 | 7/2012 | Chaffee | |
| 8,336,143 | B2 | 12/2012 | Lemmer | |
| 8,434,177 | B2 | 5/2013 | Chaffee | |
| 8,650,686 | B2 | 2/2014 | Biggie et al. | |
| 8,789,224 | B2 | 7/2014 | Wyatt et al. | |
| 8,826,478 | B2 | 9/2014 | Chaffee | |
| 8,943,627 | B2 | 2/2015 | Wilkinson | |
| 9,049,943 | B2 | 6/2015 | Caminade et al. | |
| 9,095,224 | B2 | 8/2015 | Tanaka et al. | |
| 9,101,224 | B2 | 8/2015 | Chiang et al. | |
| 9,114,048 | B2 | 8/2015 | Takeda et al. | |
| 9,204,732 | B2 | 12/2015 | Wyatt et al. | |
| 9,205,011 | B2 | 12/2015 | Pile | |
| 9,526,349 | B2 | 12/2016 | Lafleche et al. | |
| 9,566,202 | B2 | 2/2017 | Chiang et al. | |
| 9,585,490 | B2 | 3/2017 | Pile | |
| 9,597,244 | B2 | 3/2017 | Ishibashi et al. | |
| 9,707,141 | B2 | 7/2017 | Bobey et al. | |
| 9,709,183 | B2 | 7/2017 | Frayne | |
| 9,737,153 | B2 | 8/2017 | Chaffee | |
| 9,757,293 | B2 | 9/2017 | Turner et al. | |
| 9,826,842 | B2 | 11/2017 | Wilkinson | |
| 9,867,748 | B2 | 1/2018 | Takeda et al. | |
| 9,925,102 | B2 | 3/2018 | Turner et al. | |
| 10,070,733 | B2 | 9/2018 | Ohno et al. | |
| 10,143,609 | B2 | 12/2018 | Chiang et al. | |
| 10,334,959 | B2 | 7/2019 | Ohno et al. | |
| 10,335,335 | B2 | 7/2019 | Ohno et al. | |
| 10,352,804 | B2 | 7/2019 | Moniaci | |
| 10,357,414 | B2 | 7/2019 | Bossingham et al. | |
| 10,426,680 | B2 | 10/2019 | Williams et al. | |
| RE47,680 | E | 11/2019 | Chiang et al. | |
| 10,463,165 | B2 | 11/2019 | Ishibashi et al. | |
| 10,463,554 | B2 | 11/2019 | O'Reagan et al. | |
| 10,492,619 | B2 | 12/2019 | Ohno | |
| 10,543,148 | B1 | 1/2020 | Shih | |
| 10,646,391 | B2 | 5/2020 | Ohno et al. | |
| 10,653,575 | B2 | 5/2020 | Stroh et al. | |
| 11,173,085 | B2 * | 11/2021 | Galer | A47C 27/003 |
| 2005/0081300 | A1 | 4/2005 | O'Reagan et al. | |
| 2005/0114998 | A1 | 6/2005 | Leventhal et al. | |
| 2007/0209119 | A1 | 9/2007 | Chun-Chu | |
| 2008/0078966 | A1 | 4/2008 | Chang | |
| 2008/0155755 | A1 | 7/2008 | Crousore et al. | |
| 2011/0047709 | A1 | 3/2011 | Tarsaud et al. | |
| 2011/0162147 | A1 | 7/2011 | Gatzke et al. | |
| 2012/0297540 | A1 | 11/2012 | Thomas et al. | |
| 2014/0026325 | A1 | 1/2014 | Guthrie | |
| 2014/0047641 | A1 | 2/2014 | Thodupunuri et al. | |
| 2016/0184154 | A1 | 6/2016 | Lafleche et al. | |
| 2017/0027786 | A1 * | 2/2017 | Williams | A61G 7/05776 |
| 2017/0128298 | A1 | 5/2017 | Gowda et al. | |
| 2017/0231847 | A1 * | 8/2017 | Hillenbrand, II | A61G 7/1026 5/81.1 HS |
| 2017/0319413 | A1 | 11/2017 | O'Reagan et al. | |
| 2018/0042763 | A1 | 2/2018 | Galer et al. | |
| 2018/0147101 | A1 | 5/2018 | Bossingham et al. | |
| 2019/0116987 | A1 | 4/2019 | Clousing et al. | |
| 2019/0151175 | A1 | 5/2019 | Kelch et al. | |
| 2019/0174930 | A1 | 6/2019 | DeFranks et al. | |
| 2019/0174931 | A1 | 6/2019 | Ohno | |
| 2019/0336371 | A1 | 11/2019 | Abu Al-Rubb | |
| 2019/0350786 | A1 | 11/2019 | Sachdev et al. | |
| 2020/0054149 | A1 | 2/2020 | Ohno | |
| 2020/0113347 | A1 | 4/2020 | Cheng | |
| 2021/0045947 | A1 | 2/2021 | Tumavich et al. | |

FOREIGN PATENT DOCUMENTS

| | | |
|---|---|---|
| WO | 96/28056 | 9/1996 |
| WO | 02/15835 | 2/2002 |
| WO | 2009/042647 | 4/2009 |

(56) References Cited

OTHER PUBLICATIONS

"Downward." Cambridge Dictionary, Definition, https://dictionary.cambridge.org/us/dictionary/english/downward (Year: 2018).*

* cited by examiner

SUPPORT APPARATUS FOR BARIATRIC PERSON

This application is a continuation of U.S. Nonprovisional application Ser. No. 16/916,898 (P-A 583A), entitled SUPPORT APPARATUS FOR BARIATRIC PERSON, filed on Jun. 30, 2020, which claims the benefit of U.S. Provisional Application Ser. No. 62/886,096 (P-A 583), entitled SUPPORT APPARATUS FOR BARIATRIC PERSON, filed on Aug. 13, 2019, both owned by Stryker Corporation of Kalamazoo, MI, and which are incorporated by reference in their entirety herein.

BACKGROUND

The present disclosure relates to a support surface for a person and, more particularly, to a support surface, such as a mattress, for use on a support apparatus, such as a bed or other support apparatuses, which supports a bariatric person when lying in a supine position.

SUMMARY

A person support apparatus is described that facilitates expansion of the support surface to suit a particular person's needs.

In one embodiment, a support apparatus for a person includes a main cushion and at least one sleeve. The main cushion has a perimeter and sides extending around the perimeter. The sleeve is located along one side of the main cushion and is reconfigurable between a stowed configuration or state, where the sleeve is closely adjacent the one side, and an expanded configuration or state where the sleeve forms an extension of the top surface of the main cushion to thereby increase the width or the length of the support surface of the support apparatus.

In one embodiment, the sleeve includes an upper end and a lower end. The upper end of the sleeve is secured at the top surface of the main cushion, and the lower end is secured at the bottom surface of the main cushion.

In any of the above embodiments, the sleeve may be retained in its stowed state by a releasable fastener, such as a zipper, one or more hook and loop fasteners, such as VELCRO, or snaps.

In any of the above embodiments, at least a portion of the sleeve may be folded along the one side of the main cushion when in the stowed state.

According to another embodiment, the sleeve forms a space to receive a cushion insert.

In one embodiment, the sleeve is configured to open to receive the cushion insert and to be closed to contain the cushion insert in the space.

For example, the sleeve may be formed from a first sheet of material and a second sheet of material. An upper end or edge of the first sheet of material is secured to the main cushion at the top surface of the main cushion, and its lower end or edge is releasably secured by a releasable fastener to the main cushion at or near the bottom surface of the main cushion. The lower end or edge of the second sheet is secured to the main cushion at or near the bottom surface of the main cushion. Further, the lower end or edge of the first sheet of material may be releasably joinable with the free end or edge of the second sheet of material by a releasable fastener when the lower end or edge of first sheet is released from the main cushion at the bottom surface to thereby form the sleeve with the second sheet of material.

In yet another embodiment, a suitable cushion insert may be formed from the same or similar cushioning material that is used to form the main cushion. For example, the main cushion and the cushion insert may be both formed from foam.

In one embodiment, the main cushion is formed from a cushioning material having a first ILD (Indentation Load Deflection), and the cushion insert is formed from a material having an ILD greater or less than the first ILD.

In yet another embodiment, the support apparatus further includes an air supply system in communication with the sleeve to inflate the sleeve.

According to yet another embodiment, the sleeve is configured with a low friction inner surface to allow the cushion insert to be slid therein. Optionally, the sleeve may be configured with a high friction surface at one end thereof to retain the cushion insert in the sleeve.

In one embodiment, at least one of the releasable fasteners that retains the sleeve in its stowed state includes a zipper.

According to yet other embodiments, the sleeve is formed from an elastic material wherein the sleeve can stretch, for example, from its stowed state to its expanded state.

In a further embodiment, the support apparatus includes an adjustment mechanism to adjust the size of the expanded state of the sleeve. For example, the adjustment mechanism may include one or more straps to adjust the size of the expanded state of the sleeve.

In another embodiment, the main cushion includes a cover, and the sleeve is joined to the main cushion via the cover. Optionally, the sleeve is formed at least partially from a material that is either the same or similar to the material forming the cover. For example, the cover may be formed from a material such as polyurethane, including high endurance polyurethane or nylon. Similarly, the sleeve cover may be formed from a material such as polyurethane, including high endurance polyurethane, or nylon.

Alternately, the sleeve may be formed at least partially from a material different than the material forming the cover. For example, the cover may be formed from a material such as polyurethane, including high endurance polyurethane, and nylon. Similarly, the sleeve cover may be formed from a material such as polyurethane, including high endurance polyurethane or nylon.

In yet another embodiment, the support apparatus further includes a cushion insert configured so that when inserted into the sleeve, the sleeve extends above the top surface of the main cushion to thereby form a barrier.

In still yet another embodiment, the main cushion includes a mattress having a foot end, a head end, and longitudinal sides extending between the foot end and the head end, and the support apparatus includes at least two sleeves, with each sleeve extending from the head end to the foot end along a respective longitudinal side of the main cushion.

DETAILED DESCRIPTION OF THE DRAWINGS

DETAILED DESCRIPTION

Figure 1:
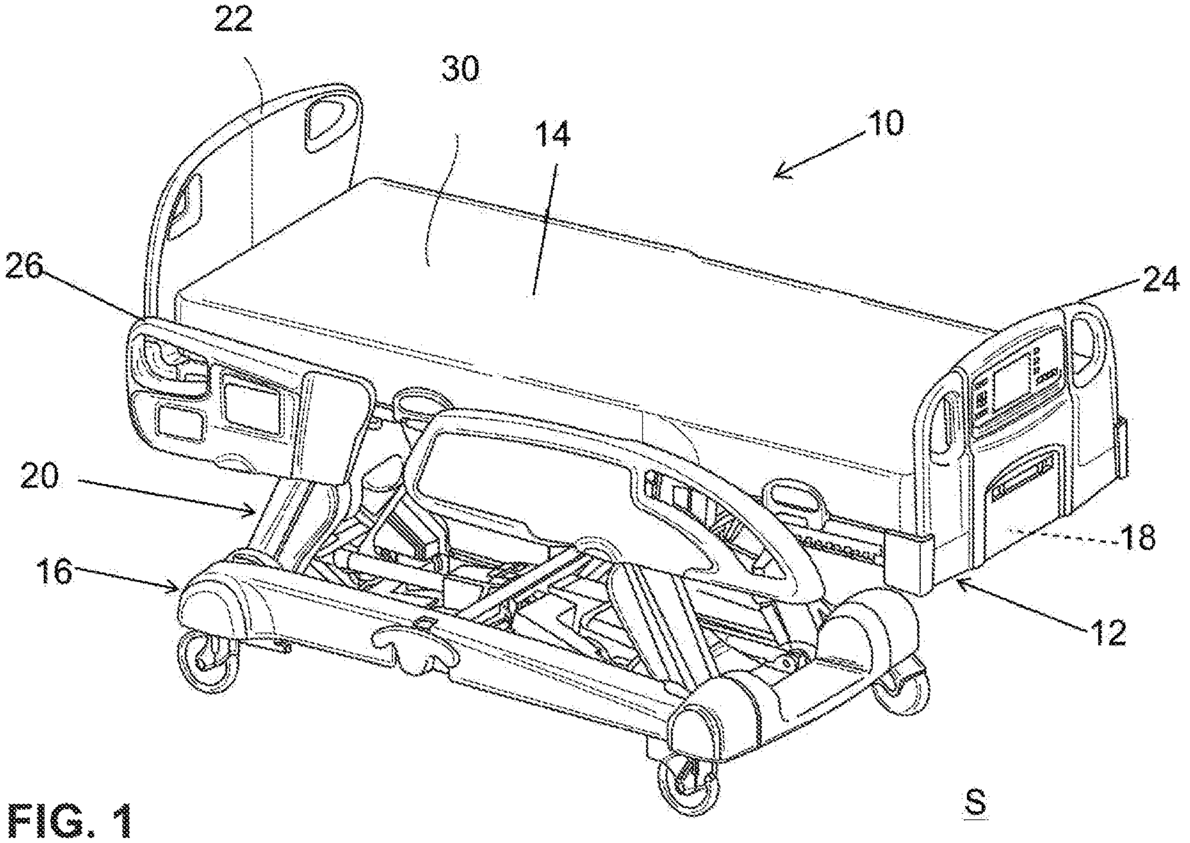
FIG. 1 is a perspective view of a patient support apparatus supporting a mattress thereon.

Referring to FIG. 1, the numeral 10 generally designates a person support apparatus, which is illustrated in the form of a bed. For the purposes of this description, person support apparatus 10 is illustrated in the context of a hospital bed and its mattress, though it should be understood that some or all the features of the mattress and mattress cover described herein may be incorporated into other types of person support apparatuses or support surfaces, such as a pad or a cushion for a cot, a stretcher, an operating room (OR) table or other support apparatuses that support a person lying in a supine position. As will be more fully described below, person support apparatus 10 includes a person support surface that can be increased to accommodate persons of greater height and/or width, for example, a bariatric person or patient.

Referring again to FIG. 1, person support apparatus 10 includes a deck 12, a mattress 14 (only shown in phantom in FIG. 1) supported on deck 12, which forms the person support surface, and a wheeled base 16. Base 16 includes a lift mechanism 20, which supports a frame 18 for supporting deck 12, for raising frame 18 and deck 12 relative to the base 16 and a floor surface S. Person support apparatus 10 also includes one or more barriers, such as a headboard 22, a footboard 24, and side rails 26, which are either mounted to frame 18 supporting deck 12 or to the deck 12 itself. In the illustrated embodiment, side rails 26 are mounted to the deck 12 so that when the head section (often referred to as the Fowler) of deck 12 is raised, the head end side rail will move with the deck 12 and form a barrier to the person even when the person is in a seated or elevated position. As will be more fully described below, the person support surface area, which is defined by mattress 14, is adjustable so that it can accommodate wider and/or taller people, for example, bariatric people.

Figure 2:
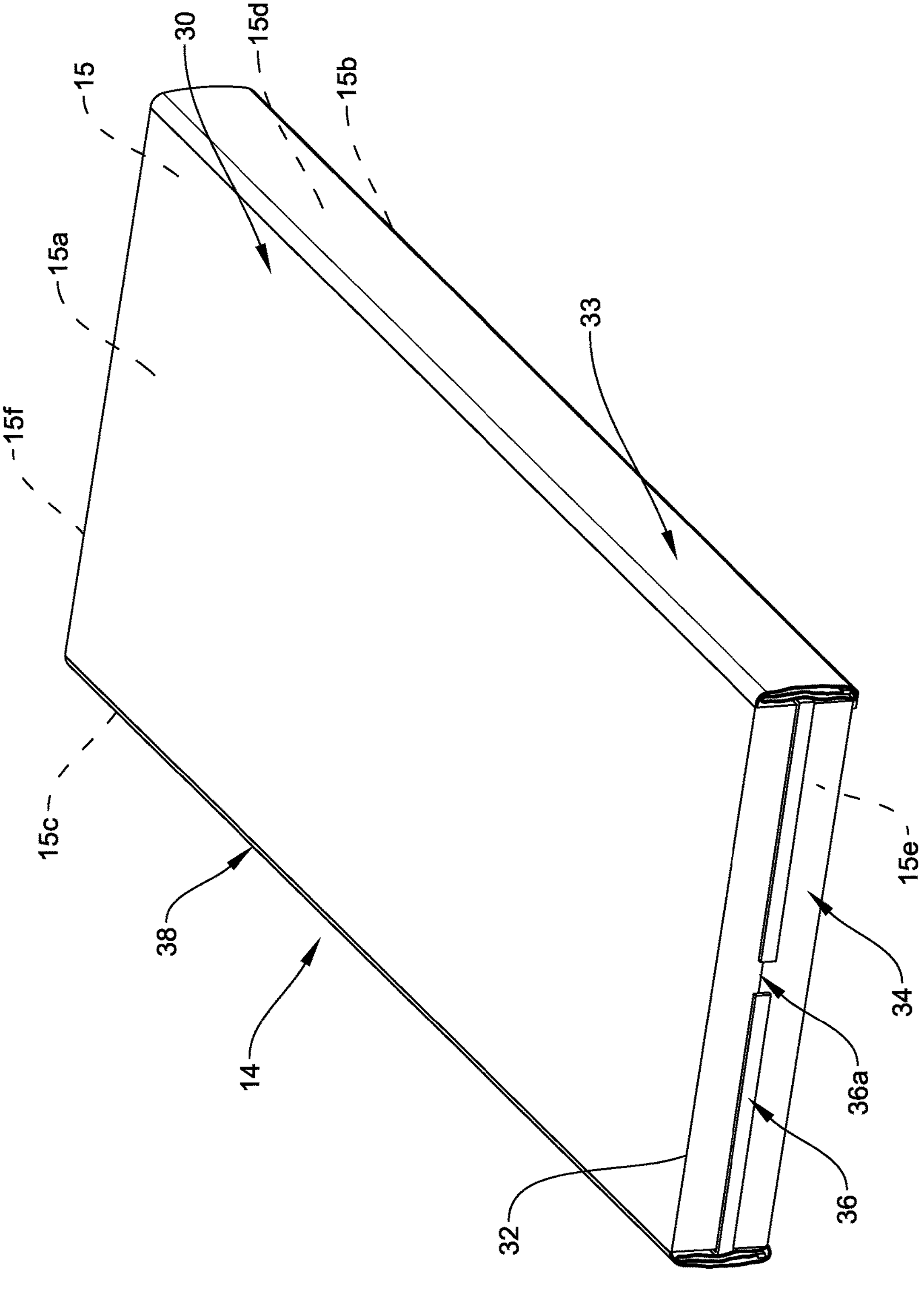
FIG. 2 is a perspective view of the mattress and cover.
Figure 3:
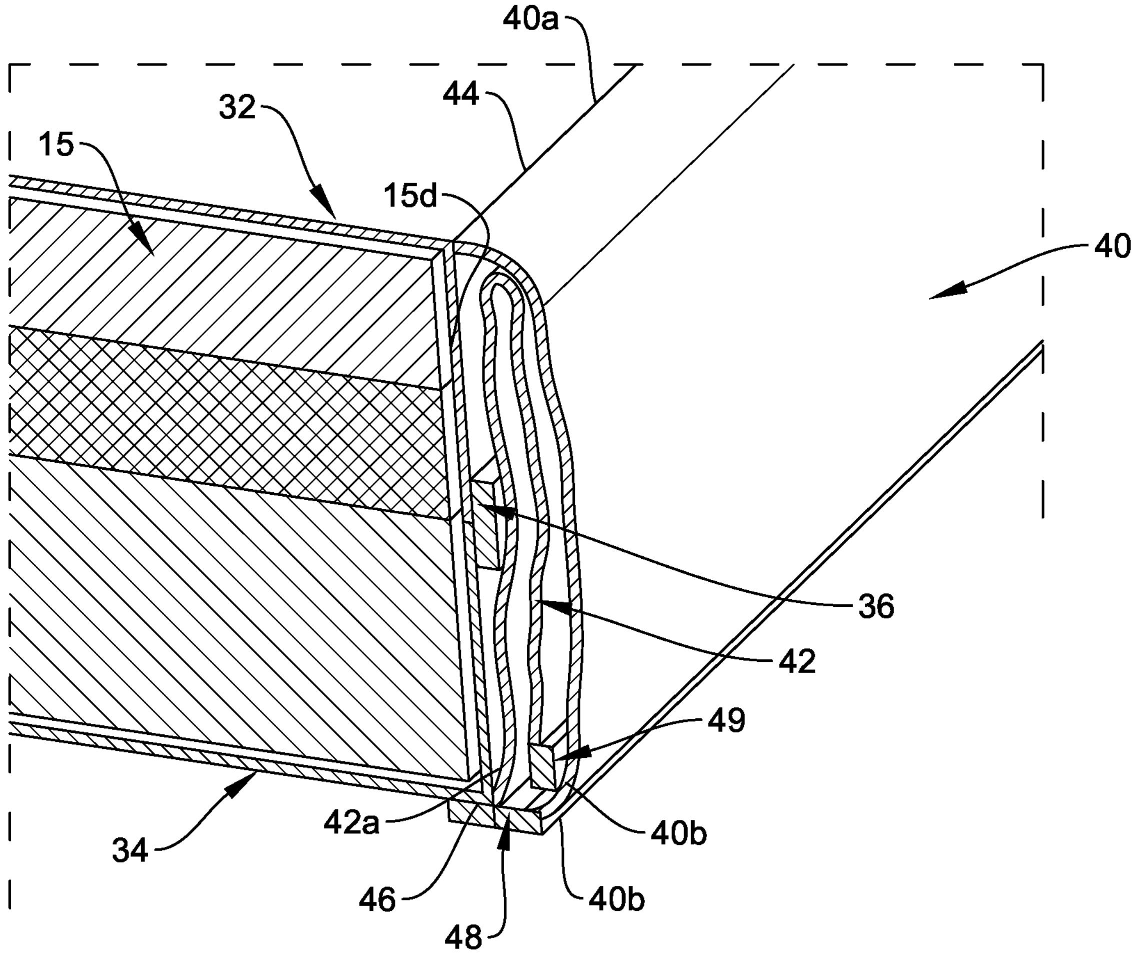
FIG. 3 is an enlarged cross-section view taken along line III-III of FIG. 2 illustrating a cover with a bolster sleeve in a stowed position.

Referring to FIGS. 2 and 3, mattress 14 is formed by a main cushion 15 and includes a mattress cover 30, which covers the top surface 15*a*, the bottom surface 15*b*, longitudinal sides 15*c*, 15*d* that extend from the head end to the foot end of the main cushion 15, and the lateral sides 15*e*, 15*f* that extend across the head and foot ends of the main cushion 15. Suitable cushioning material for the main cushion includes foam, such as polyurethane foam, memory foam, viscoelastic foam, including gel viscoelastic foam, neoprene foam, or polyurethane foam, or an inflatable cushion formed from a plurality of bladders or combination thereof.

Optionally, cover 30 includes an upper cover portion 32 and a lower cover portion 34 that are joined together at a seam by a perimeter zipper 36, such as a full perimeter zipper or partial perimeter zipper as noted below, to facilitate removal for cleaning or replacement of the cover from the main cushion forming the mattress. In the illustrated embodiment, the upper and lower portions 32, 34 of cover 30 may be joined by a seam 36*a* (FIG. 2) formed by stitching so that the upper cover portion 32 is not completely detachable from lower cover portion 34, and with the remainder of the upper and lower portions 32, 34 of cover 30 joined with a partial perimeter zipper, i.e., a zipper that extends only around a portion of the perimeter of the main cushion 15. The location of the zipper may vary, but in the illustrated embodiment is located along longitudinal and lateral sides 15*c*, 15*d* and 15*e*, 15*f* between the top and lower sides 15*a*, 15*b* of main cushion 15 and, optionally, about midway between the top and lower sides 15*a*, 15*b* of main cushion 15.

To facilitate expansion of the person support surface formed by mattress 14, mattress 14 includes one or more bolster sleeves 38 along one of longitudinal sides 15*c*, 15*d* of main cushion 15, which extend from cover 30 and, therefore, together may form a mattress cover assembly. Each sleeve 38 is selectively reconfigured between a stowed configuration or state (FIG. 3) wherein the sleeve extends along the longitudinal side of the main cushion 15, and is closely adjacent the respective longitudinal side of the main cushion 15, and an expanded configuration or state wherein the sleeve forms an extension of the top surface of the main cushion 15 to thereby increase the support surface of the mattress.

In the illustrated embodiment, there are two sleeves 38, each extending the full length of each longitudinal side 15*c*, 15*d*; however, it should be understood that a single sleeve may be provided on one side or two or more sleeves may be provided at each longitudinal side. Although described herein in reference to a mattress, it should be understood that the sleeves may be used in connection with other types of pads or cushions, as noted above. Further, although not illustrated, the length of mattress 14 may be similarly extended by locating one or more sleeves 38 at the head end and/or foot end of main cushion 15. Additionally, the sleeve or sleeves may extend only partially along the longitudinal length of the main cushion.

When in their expanded configuration, sleeves 38 are optionally filled with a cushion insert, including an inflatable insert. Alternately, they may be partially or fully inflated with fluid, such as air. Thus, when filled or inflated, the support surface is extended beyond the perimeter of the core of the mattress, such as in the lateral direction, to provide an extended support surface for a portion of a person's body that may exceed or go beyond a conventional mattress, for example, in the case of a bariatric person, such as to form a 42" or 48" or 54" wide mattress. Other widths may also be provided. Optionally, the sleeves may be sized and shaped so that the extended support surface is higher than the support surface of the main cushion to form a barrier on either side of the mattress, which can help with reducing falls from the mattress. In this manner, the inserts may form “bolsters”.

In the illustrated embodiment, sleeves 38 are formed from an upper bolster cover portion 40 and a lower bolster cover portion 42, which are each formed from panels of material. As will be more fully described below, the material forming the panels may be the same as the material forming main cushion cover or may be different. The upper edge 40*a* of the upper bolster cover portion 40 is secured to cover 30, for example, by a seam 44 at or near the upper edge of the cover. Seam 44 may be formed by stitching, welding, or gluing upper bolster cover portion 40 to cover 30. Similarly, the lower upper edge 42*a* of the lower bolster cover portion 42 is secured to cover 30, for example, by a seam 46 at the lower edge of cover 30. Seam 46 may be formed by stitching, welding, or gluing lower bolster cover portion 42 to cover 30.

Figure 7:
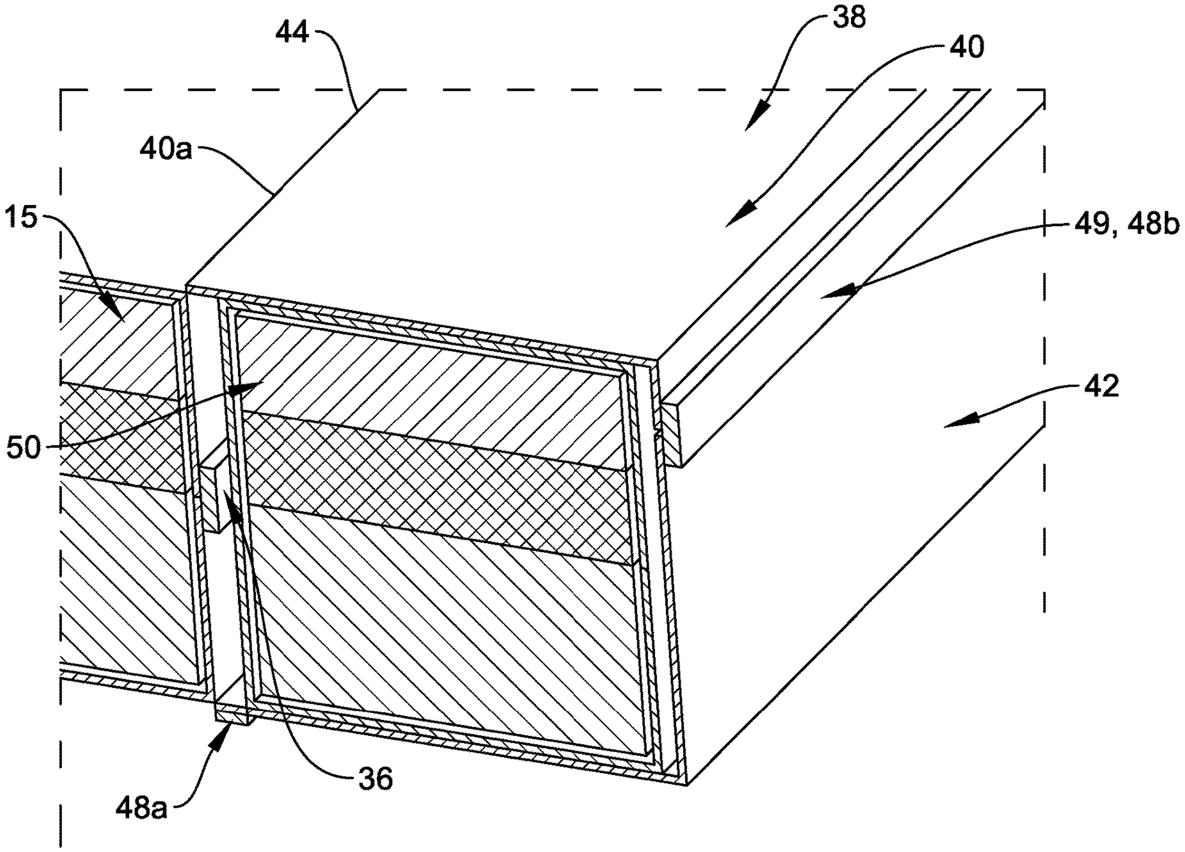
FIG. 7 is an enlarged view of the perspective cross-section of FIG. 6.

As best seen in FIG. 3, when in its stowed position, lower bolster cover portion 42 is folded against a respective longitudinal side 15*d* (or 15*c*) of main cushion 15 and held in its folded configuration, where it extends along and is closely adjacent the longitudinal side of main cushion 15, by upper bolster cover portion 40. When in its stowed position, upper bolster cover portion 40 also extends along and is closely adjacent the longitudinal side of main cushion 15 and, further, is releasably secured to cover 30, for example, by a fastener 48 (formed from zipper halves 48*a* and 48*b* (see FIG. 7)) at its lower edge 40*b* beneath seam 46, such as a zipper, hook and loop strips, or snaps. This is referred to as the “stowed connection fastener or zipper”. In this manner, upper bolster cover portion 40, as noted above, retains lower bolster cover portion 42 folded against its respective longitudinal side 15*d* (or 15*c*) of main cushion 15 in its folded configuration.

Figure 4:
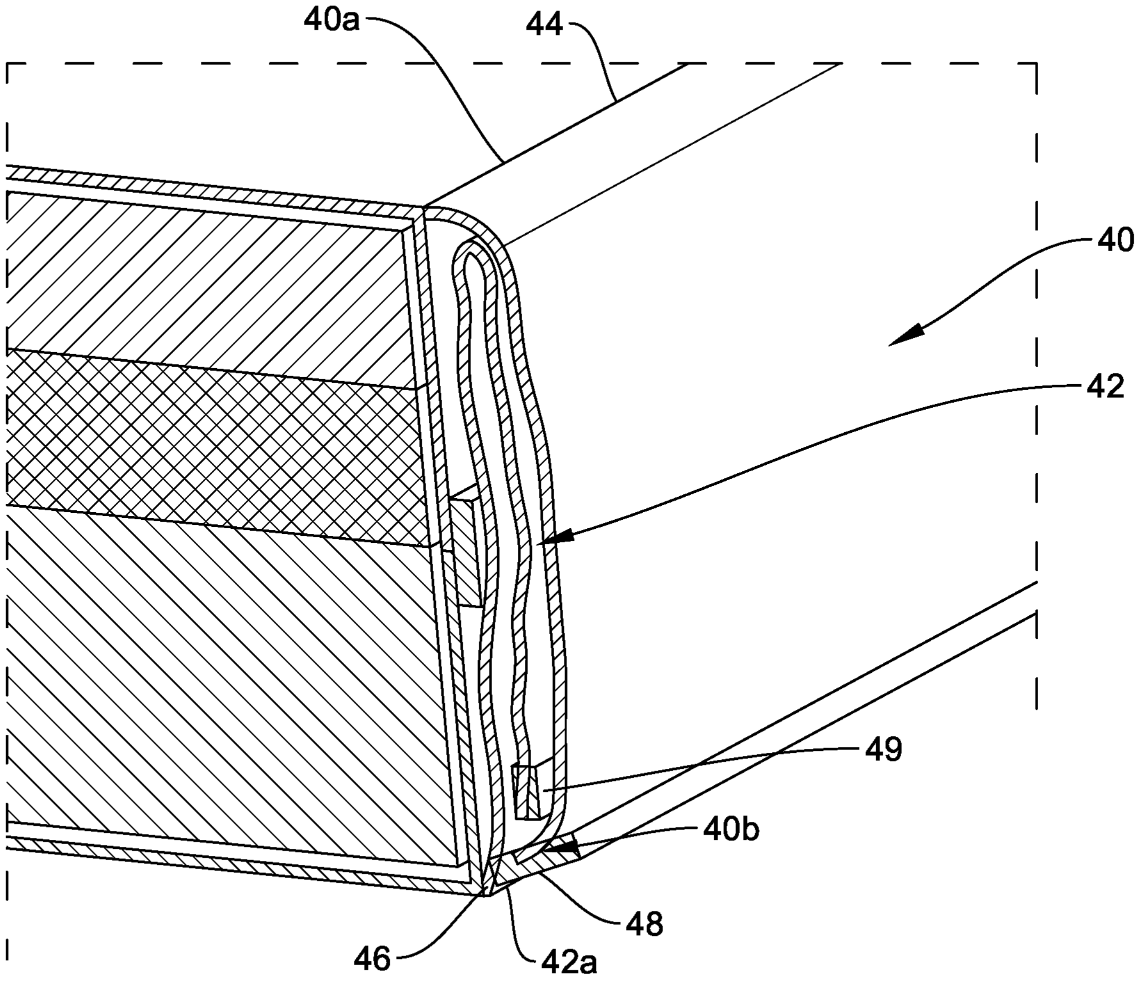
FIG. 4 is a similar view to FIG. 3 illustrating an alternate location for the bolster sleeve fastener.
Figure 5:
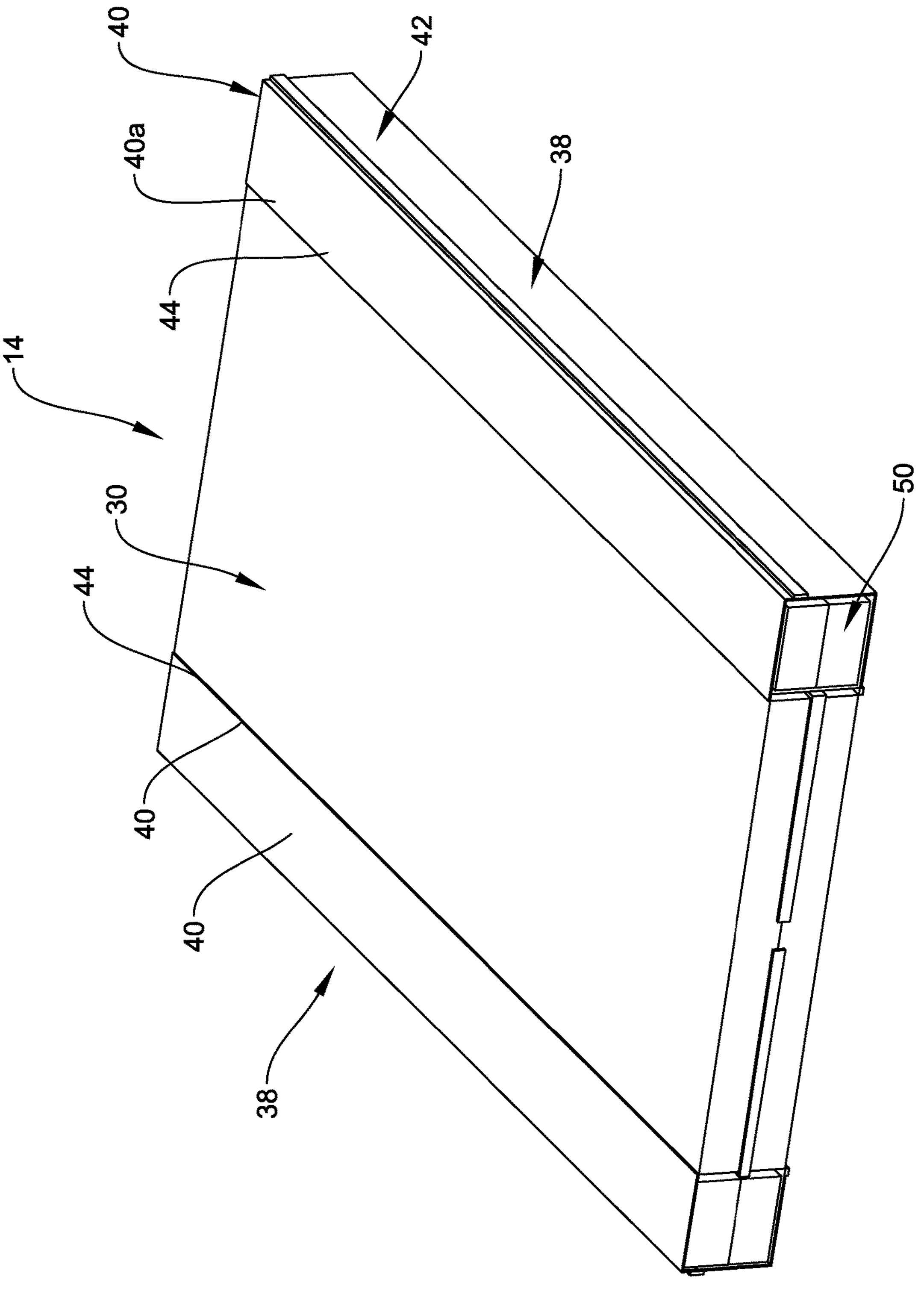
FIG. 5 is a perspective view of the mattress and cover with the bolster sleeve in its deployed position and filled with a cushion insert.

To deploy sleeves 38 from their stowed positions, the lower edge 40*b* of upper bolster cover portion 40 is released (e.g., such as by unzipping zipper half 48*b* from zipper half 48*a*, “the stowed connection zipper”). Thereafter, lower bolster cover portion 42 can be unfolded and then secured at its free edge 42*b* via zipper half 48*b* to the lower edge 40*b* (now free lower edge) of upper bolster cover portion 40, for example, by a releasable fastener 49, such as a zipper half, hook and loop strips or snaps, which is referred to as the “deployed connection fastener or zipper”. For example, one half of the stowed connection zipper 48*a* may be mounted at or near the lower edge of cover 30 to form the stowed connection for the upper bolster cover portion 40 while the other half of the stowed connection zipper 48*b* is mounted to the free lower edge of upper bolster cover portion 40. When this connection is released, the zipper half 48*b* on the upper bolster cover portion 40 may form a deployed zipper connection with another half of a zipper (49) (identical to the zipper half on the stowed connection zipper mounted to the cover), mounted to the free edge of lower bolster cover portion 42. In this manner, the upper and lower bolster cover portions can then be joined together at their respective free edges to thereby form the sleeve. Alternately, the stowed connection zipper half may be mounted to the lower bolster cover portion 42 at or near seam 46, such as shown in FIG. 4.

In this manner, upper bolster cover portion 40 and lower bolster cover portion 42 form together the sleeve into which a cushioning material, such as a cushion insert 50, can be inserted. As noted above, this cushioning material may be a similar cushioning material that forms or forms a part of main cushion 15, or may be fluid, such as air or a combination of both.

Optionally, when formed by a solid material or materials, the cushion insert 50 may be placed adjacent the longitudinal side of main cushion 15 prior to the upper bolster cover portion 40 and lower bolster cover portion 42 be joined together via the deployed connection fastener. Alternately, the cushioning insert may be inserted into the space formed by upper bolster cover portion 40 and lower bolster cover portion 42 after they are joined together.

Figure 6:
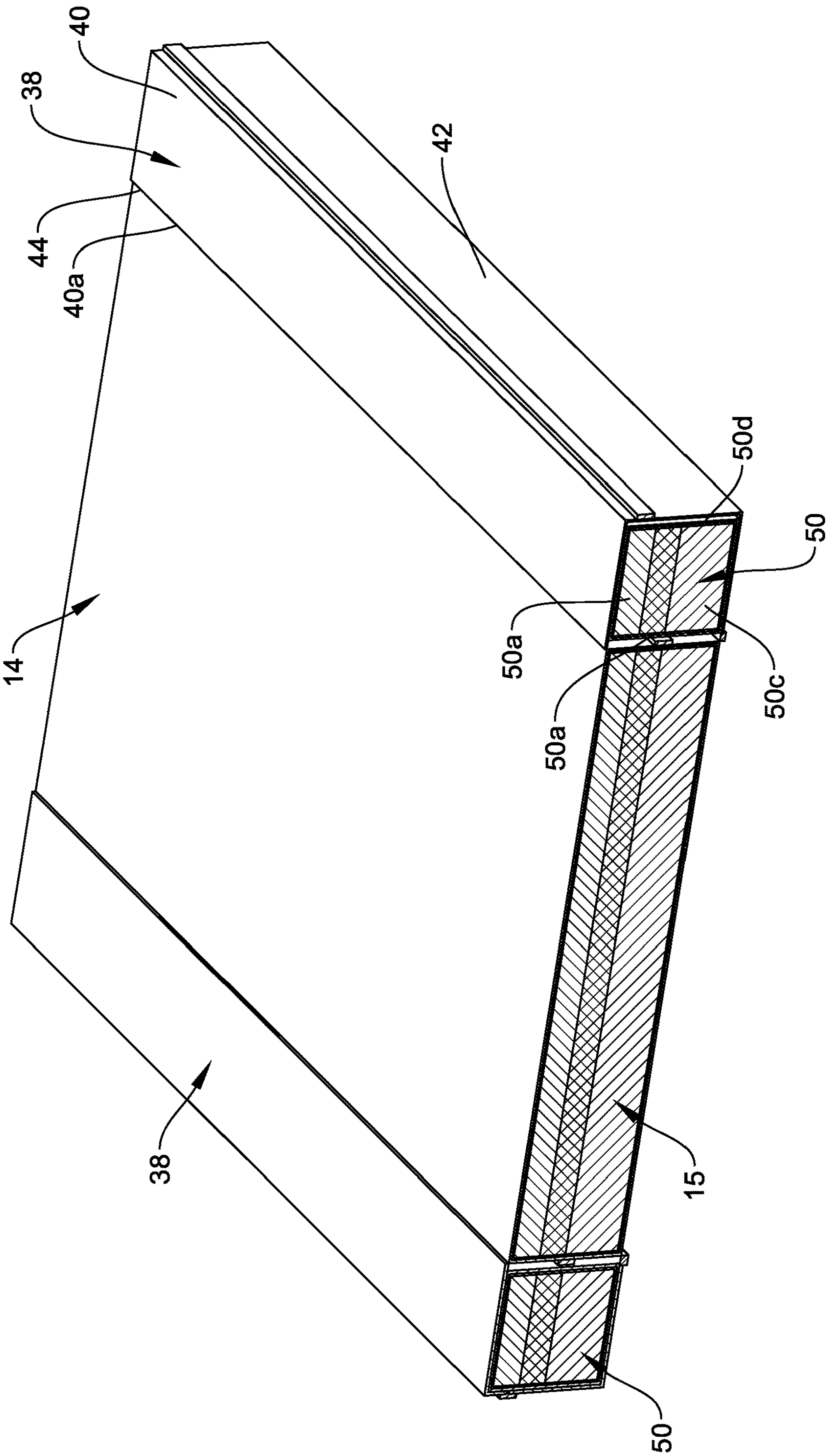
FIG. 6 is a perspective cross-section view taken along line VI-VI of FIG. 5.

As noted above, cushion insert 50 may be formed from a single layer of cushion or cushioning material or multiple layers of cushion 50*a*, 50*b*, 50*c* (FIG. 6). Optionally, cushion insert 50 may be formed from the same material as or different material than the main cushion. In the illustrated embodiment, cushion insert 50 is formed from multiple layers of cushion 50*a*, 50*b*, 50*c*, such as foam, joined together, such as by an adhesive. Alternately or in addition, layers 50*a*, 50*b*, and 50*c*, be held together by a sleeve 50*d* prior to insertion into the sleeve formed by the upper and lower bolster cover portions.

In one embodiment, each of the layers is formed from a different material. Alternately, the layers may be formed from similar materials having different properties. For example, the main cushion 15 may be formed from a cushioning material, such as foam, having a first ILD, with the cushion insert being formed from a material, such as foam, having the same ILD as the first ILD or an ILD greater or less than the first ILD. Suitable foams include: Polyurethane foam memory, viscoelastic foam, including gel-viscoelastic foam, neoprene foam, and polyethylene foam. Suitable ILD ranges for the foam layers 50*a*, 50*b*, 50*c* include 5 to 25 ILD, 20 to 60 ILD, or 45 to 80 ILD. In one embodiment, the ILD for at least the top layer of foam of cushion insert 50 may be higher than the ILD of the adjacent the main cushion so that the bolster cushion insert will deflect less than the main cushion, and as a result will act as a barrier when a person is lying on the main cushion. The main cushion layers may have an ILD in a range of 5 to 25 ILD, 20 to 60 ILD, or 45 to 80 ILD.

To facilitate retention of the cushion insert, which, as noted, serves as a bolster, the inside of the bolster cover portions may include a tacky or high friction material, which helps stop the cushion insert from sliding out once in position. Alternately, when cushion insert 50 is enclosed in a sleeve (e.g. sleeve 50*d*), the cushion insert sleeve may have a tacky or high friction material on its outer surface, which helps stop the cushion insert from sliding out once in position. For example, in one embodiment, as noted above, the cushion insert may be positioned adjacent the main cushion 15 when the upper and lower portions of the bolster cover are unattached and the bolster sleeve is open. Thereafter, the upper and lower bolster cover portions may be secured together to retain the cushion insert 50 in sleeve 38.

As noted above, alternately, the cushion insert may be inserted after the upper and lower portions of the bolster cover are secured together, in which case the cushion insert and/or the upper and lower portions of the bolster cover may include a low friction or slippery surface to allow the bolster to be slid into the space defined by the bolster cover portions. For example, the low friction or slippery surface may be provided by nylon, KEVLAR, or polyurethane. In one embodiment, most of the interface, e.g., in a range of 60-90% of the interface, may be slippery, with a high friction or tactile surface provided at the end of the interface to prevent the bolster from popping out. For example, the high friction or tactile surface may be provided by high stick polyurethane or vinyl.

Alternately, one end of the sleeve may be closed or reduced in size to trap the cushion insert therein. The other end of the sleeve may also be at least partially closed after insertion of the cushion insert by, for example, a pull cord that gathers the end of the sleeve together or a strap that is extendible over the open end.

The high friction or low friction may be formed by a coating on the inside of the upper and lower portions of the bolster cover or on a coating formed on the bolster itself. For example, the cushion insert, or the upper and lower portions of the bolster cover, may include a DARTEX material cover. For example, the bolster cover may be a double lamination of material, with the same material, such as DARTEX, on both sides (exterior and interior surfaces).

The height and/or the cross-section shape of the cushion insert may be varied. For example, as noted, the cushion insert may have a height so that it forms a support surface higher than the support surface of the main cushion—this way it can act as a barrier and help prevent people from falling off the mattress. Alternately, or in addition, as noted, it may be made from a stiffer material than the main cushion so that when a person is lying on the mattress, they will sink in deeper into the main cushion, and the cushion insert support surface will again be higher than the support surface formed by the main cushion and form a barrier.

In the illustrative embodiment, the shape of the cross-section of the cushion insert is rectangular, and optionally square. However, it should be understood that the shape of the cross-section of the cushion insert may be rectangular or wedge-shaped or triangular.

As noted above, the cushion insert may be formed from a monolithic material or may be formed from different materials, such as different layers of material, such as foam, which are secured together by an adhesive.

In another embodiment, at least portions of the upper and/or lower portions of the bolster cover may be elastic. Further, when formed from material having sufficient elasticity, the upper and lower portions of the bolster cover may be continuous and be formed from a single panel of material, thus eliminating the need for the releasable fastener noted above (that joins the two halves together). Optionally, the bolster cover may include an adjustment mechanism, such as a strap with a buckle, to tighten the cushion insert and/or to limit the expansion of the bolster cover.

In yet another embodiment, the material(s) of the upper and/or lower portions of the bolster cover may be the same material as the main cushion cover (30) or they may be different material(s) than the main cushion cover. For example, the main cushion cover may be formed from a material such as polyurethane, including high endurance polyurethane or nylon. Similarly, the bolster cover or sleeve may also be formed from such as polyurethane, including high endurance polyurethane or nylon. Suitable commercial materials for the cover and the bolster cover or sleeve include VINTEX and DARTEX.

Alternately, as noted, the sleeve may be formed at least partially from a material different than the material forming the cover of the main cushion. For example, the cover of the main cushion may be formed from a material such as polyurethane. While the sleeve may be formed from a material such as nylon.

Figure 8:
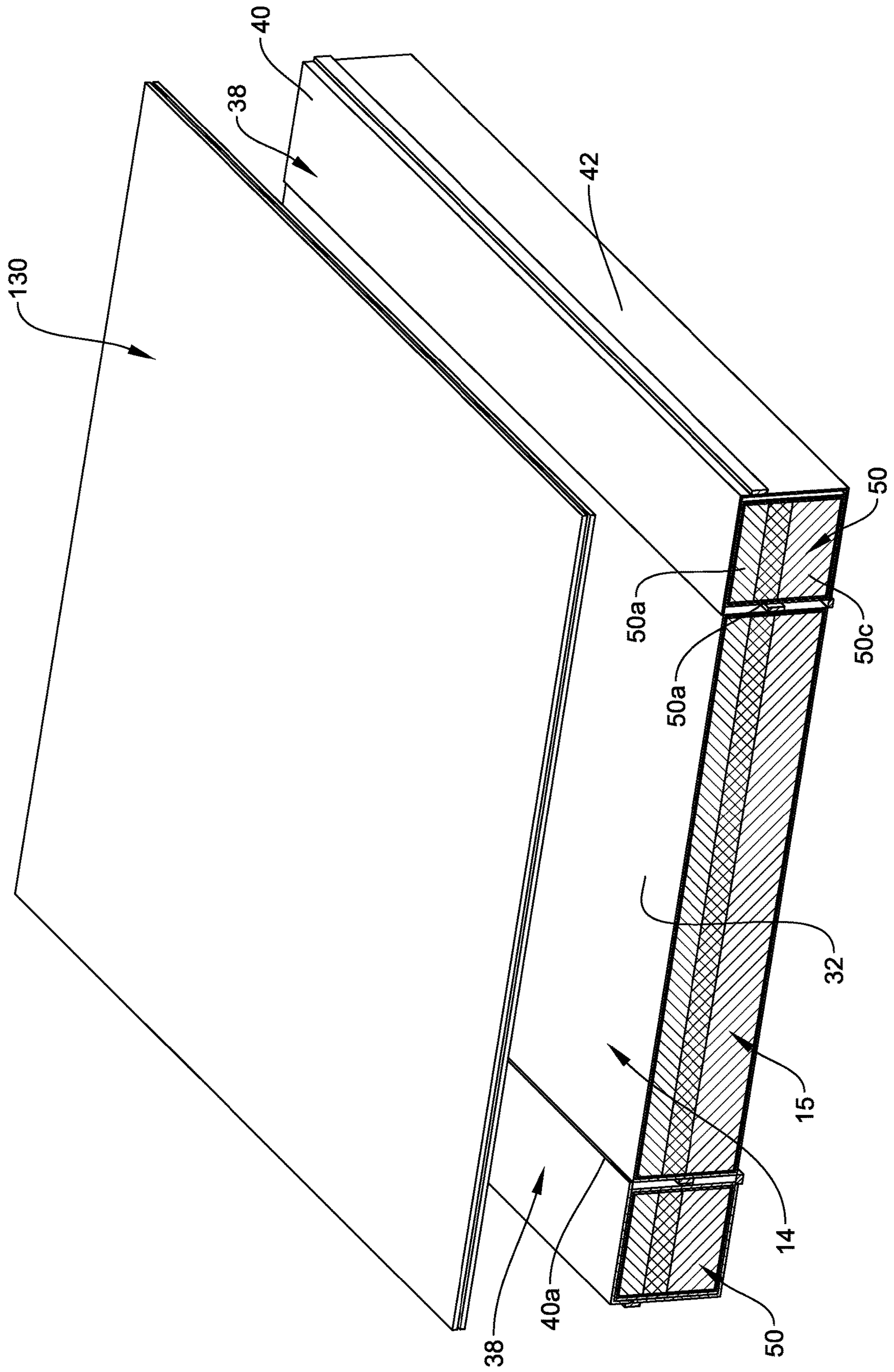
FIG. 8 is a similar view to FIG. 6 illustrating another embodiment of the mattress.
Figure 9:
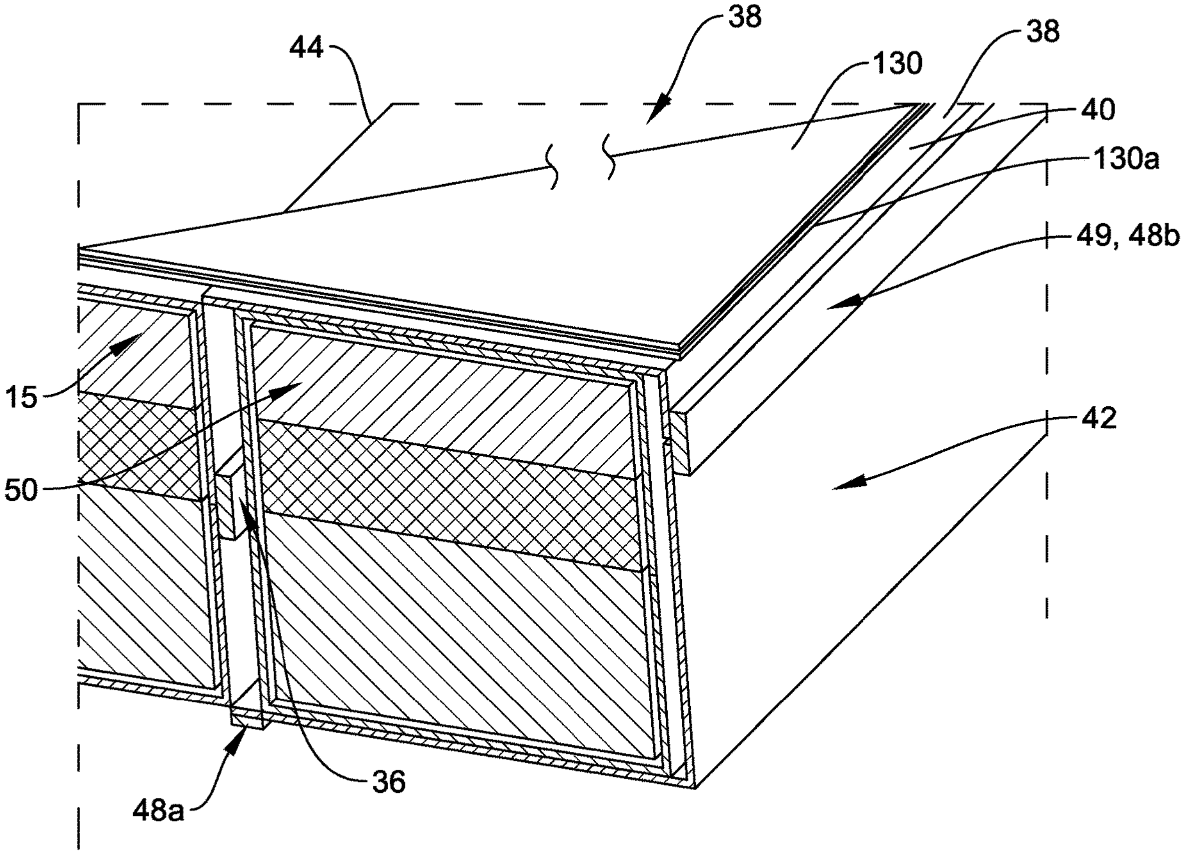
FIG. 9 is an enlarged view of detail IX-IX of FIG. 8.
Figure 10:
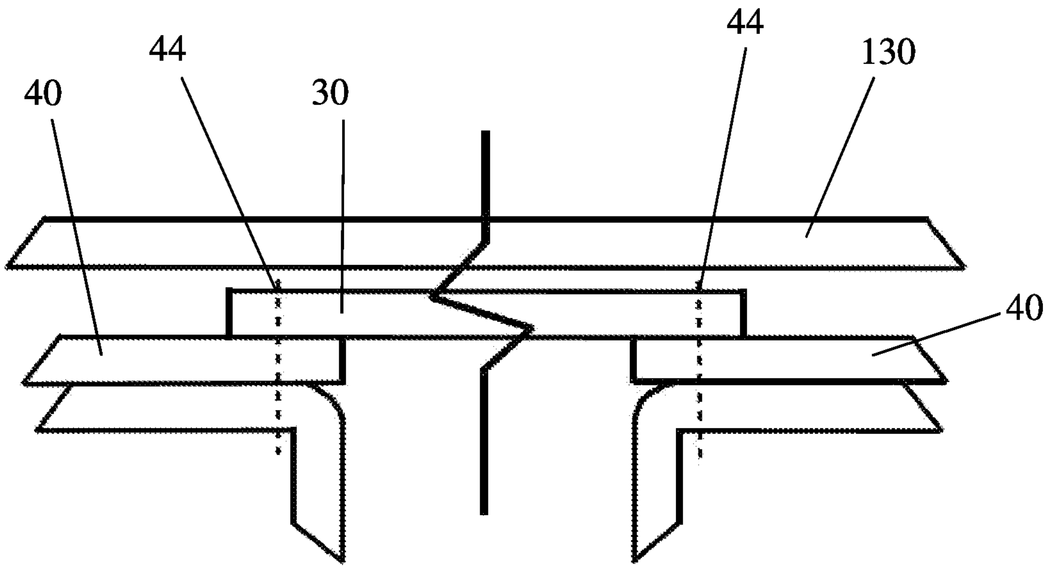
FIG. 10 is an enlarged cross-section view taken along line X-X of FIG. 9.

Referring to FIG. 8, mattress 14 may include an additional layer 130, which overlays cover 30. In the illustrated embodiment, layer 130 extends over upper cover portion 32 of cover 30 and over bolster sleeves 38 to thereby extend the full width of the mattress, including when the bolster sleeves are filled with the cushions inserts, such as by insertion or inflation. Layer 130, therefore, extends over the seams 44 that join upper bolster cover portions 40 of bolster sleeves 38 to cover 30. With this arrangement, cover 130 may reduce, if not eliminate, detection (by a person lying on mattress 14) of the transition between the cover and the upper bolster cover portions.

For example, layer 130 may be formed from a similar material to the cover and/or bolster sleeves. Additionally or alternatively, layer 130 may be formed from a cushioning material to further reduce, if not eliminate, detection of the transition between the cover the upper bolster cover portions. Additionally, cover 130 may facilitate cleaning of the mattress cover assembly by covering and, thereby, reducing the pathways, which can be formed by stitching, through or at the mattress cover/bolster interface.

To secure layer 130 in place, layer 130 may be secured to upper bolster cover portion 40 at or near its respective outer longitudinal edges 130 by stitching or by a releasable fastener or fasteners, such as hook and loop fasteners. For examples of suitable materials for layer 130, reference is made to cover 30 and upper and lower bolster cover portion 40, 42.

Figure 11:
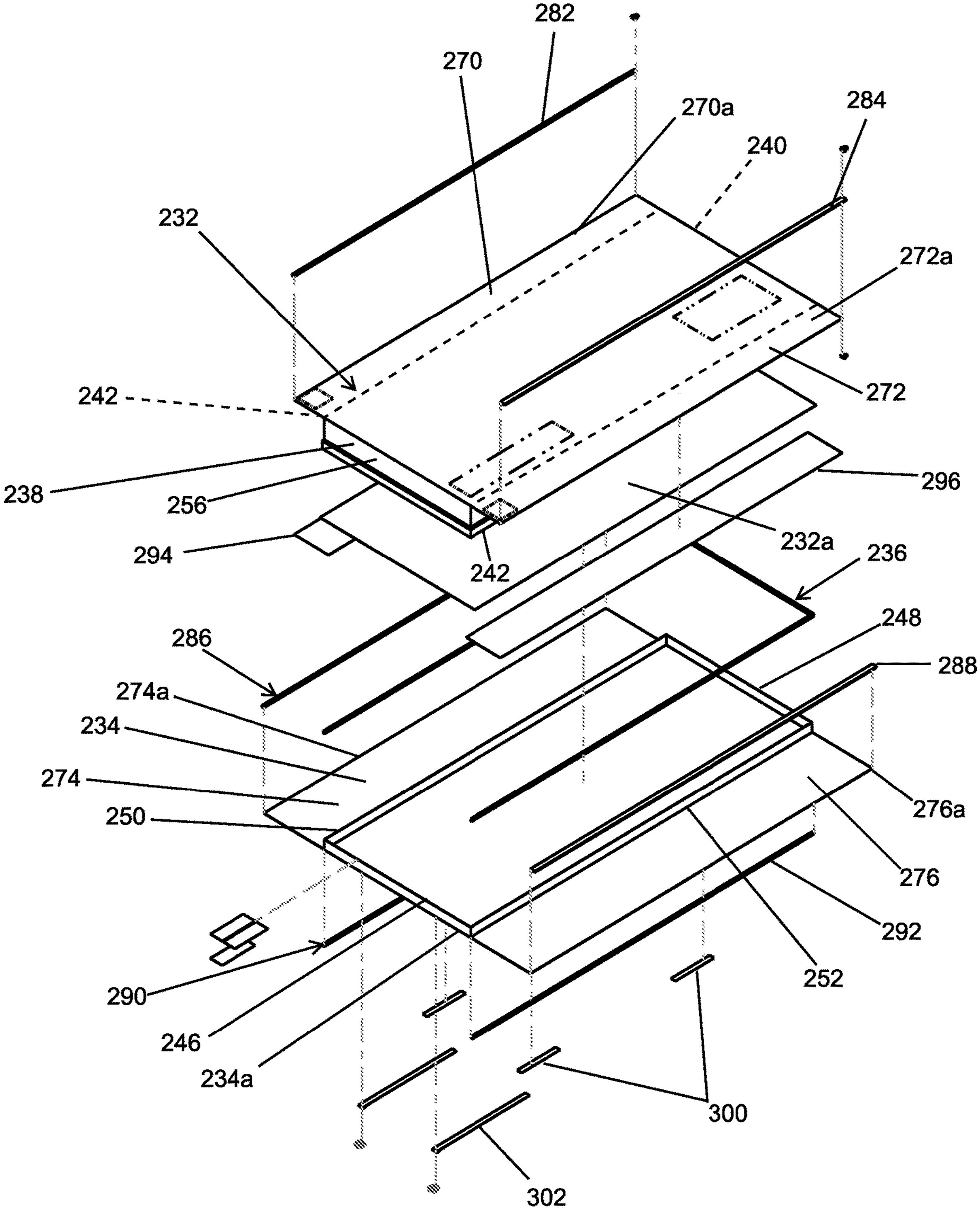
FIG. 11 is an exploded perspective view of another embodiment of a cover.
Figure 12:
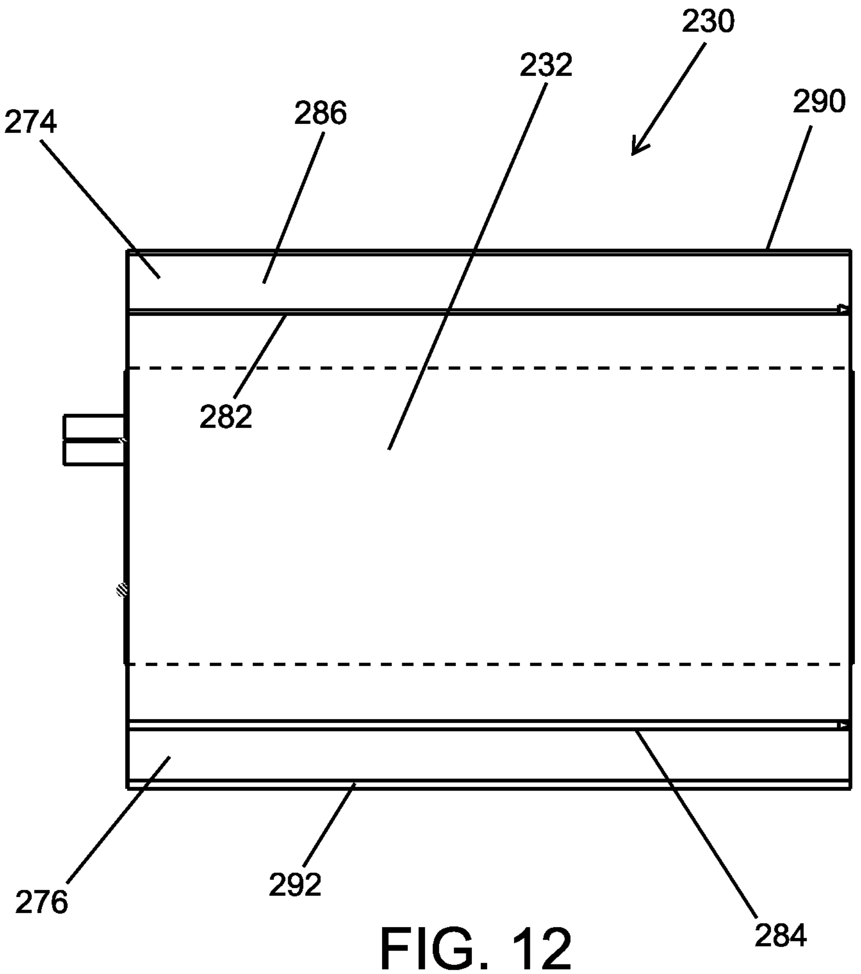
FIG. 12 is a top plan view of the cover of FIG. 11.
Figure 13:
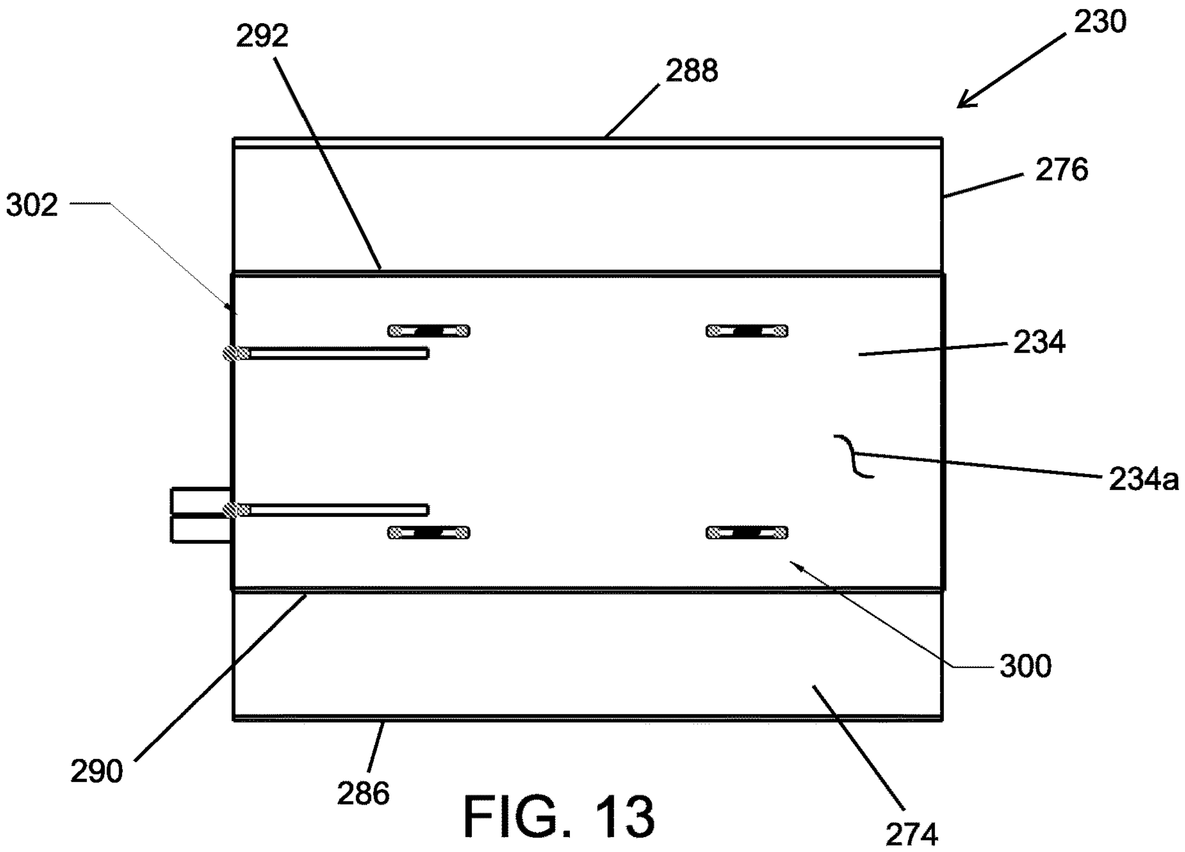
FIG. 13 is a bottom plan view of the cover of FIG. 11.
Figure 14:
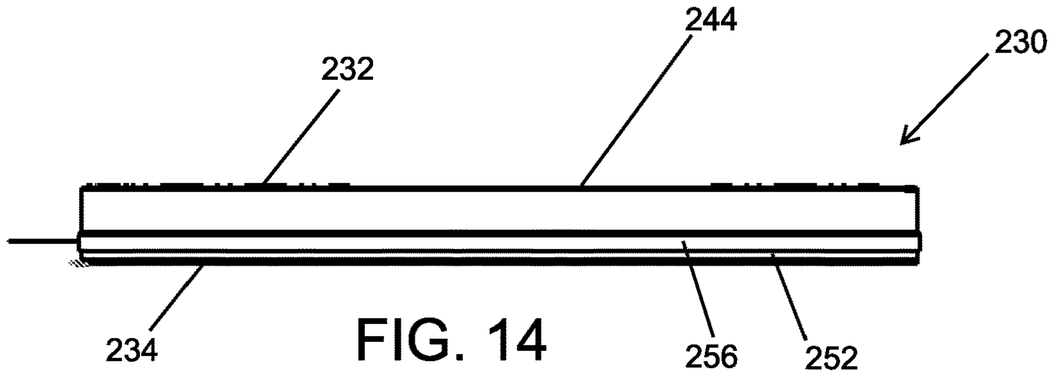
FIG. 14 is a side elevation view of the cover of FIG. 11.
Figure 15:
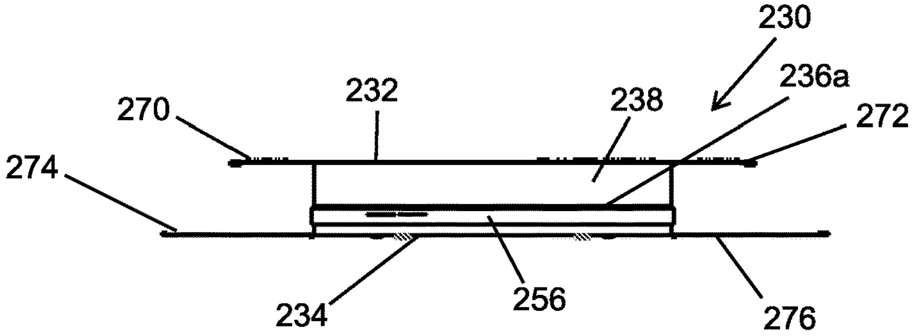
FIG. 15 is an end elevation view of the cover FIG. 11.

Referring to FIGS. 11, 12, and 13, the numeral 230 designates another embodiment of a cover for the mattress described above. As will be more fully described below, cover 230 is configured to enable the width and/or length of the support surface of the mattress to be increased by deploying sleeves that accept cushion inserts to widen or lengthen the mattress. Further, although constructed from several panels of material, cover 230 is configured to have reduced pathways for liquid intrusion.

Cover 230 includes an upper cover portion 232 and a lower cover portion 234, which are each formed from a panel of flexible material. Upper cover portion 232 and lower cover portion 234 are joined together at a seam by a perimeter zipper 236, such as a partial perimeter zipper (e.g. three sided zipper as shown) or a full perimeter zipper to facilitate removal of the cover for cleaning or replacement from the main cushion forming the mattress.

Upper cover portion 232 may, for example, be formed from a flexible liquid impermeable panel of material, such as polyurethane, polyurethane coated fabrics, or nylon, which forms the exterior surface of cover 230. Further, upper cover portion 232 may include an additional panel 232*a* (FIGS. 11 and 20) of material similar to or the same as the upper panel, which is joined with the upper panel, for example, by stitching, and which forms the inner or interior surface of the cover 230. Lower cover portion 234 may, for example, also be formed from a flexible, liquid impermeable panel of material, such as VINTEX/SOFTICK STANDAR232D 53-14, polyurethane, polyurethane coated fabrics, vinyl, or nylon.

In the illustrated embodiment, extending downwardly from the upper cover portion 232 are end panels of material 238, 240 and side panels of material 242, 244 that together form a perimeter wall to which one half of zipper 236 is mounted. Similarly, lower cover portion 234 includes end panels of material 246, 248 and side panels of material 250, 252 extending upwardly therefrom (as viewed in FIG. 11) that together form an upstanding perimeter wall to which the other half of the zipper 236 is mounted, for example, by stitching. In the illustrated embodiment, the zipper 236 is a U-shaped zipper and, therefore, only extends around three sides of the two perimeter walls. The remaining portion of the perimeter walls may be joined by a seam 254, such as shown in FIG. 22, formed by stitching, which will be more fully described below.

Figure 21:
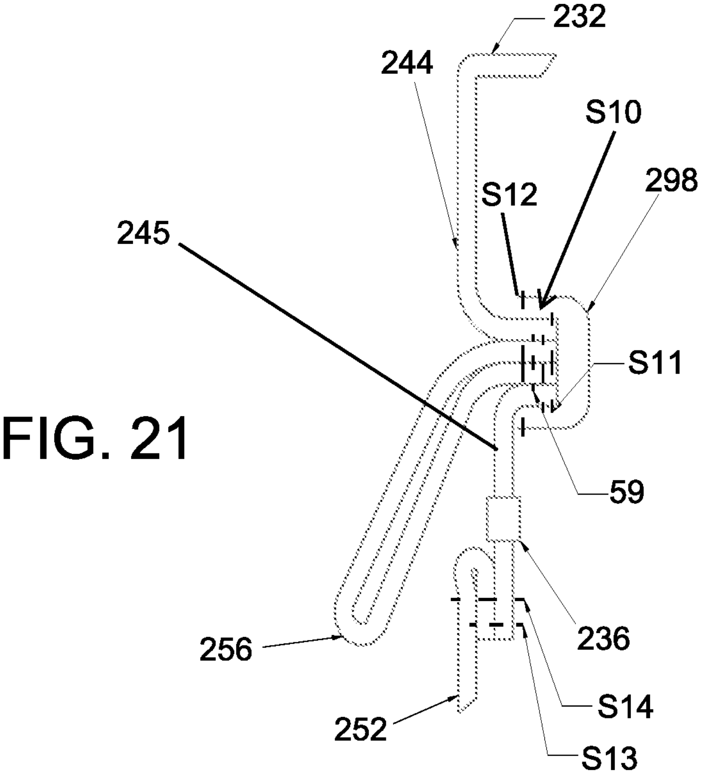
FIG. 21 is an enlarged detail view taken along line XXI-XXI of FIG. 16.
Figure 22:
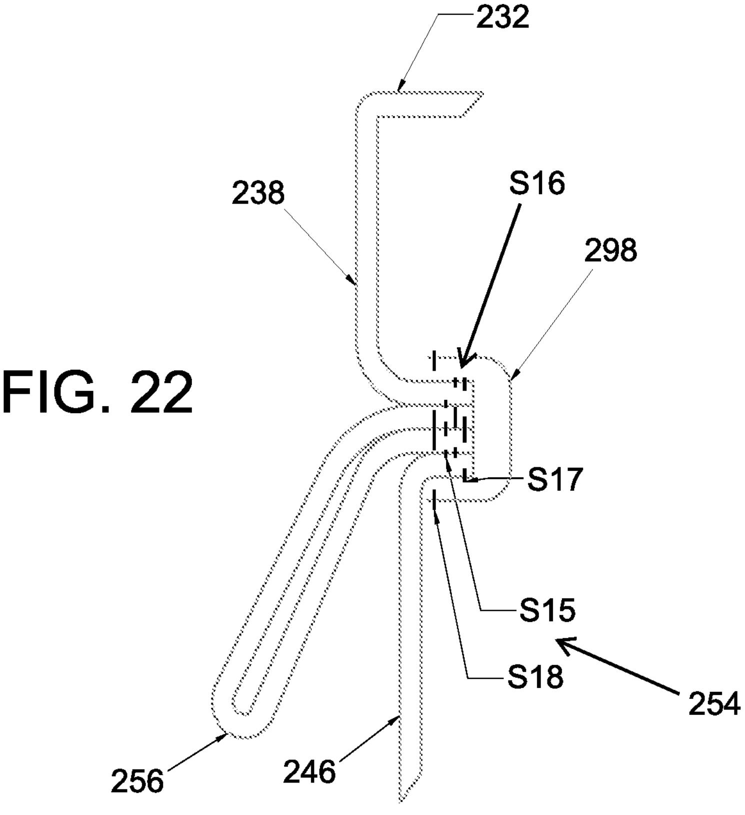
FIG. 22 is an enlarged detail view taken along line XXII-XXII of FIG. 16.

To protect the zipper 236 from liquid intrusion, cover 230 includes a flap 256, which may be formed from a folded over piece of fabric, such as shown in FIGS. 21 and 22. As noted, zipper 256 may extend around the full perimeter of the perimeter walls or may extend only alongside panels 242, 244 and 250 and 252 and end panels 240 and 248. The location of the zipper may vary, but in the illustrated embodiment is located along longitudinal and lateral sides of cover 230 and, optionally, about midway between the top and lower sides of cover 230.

Figure 16:
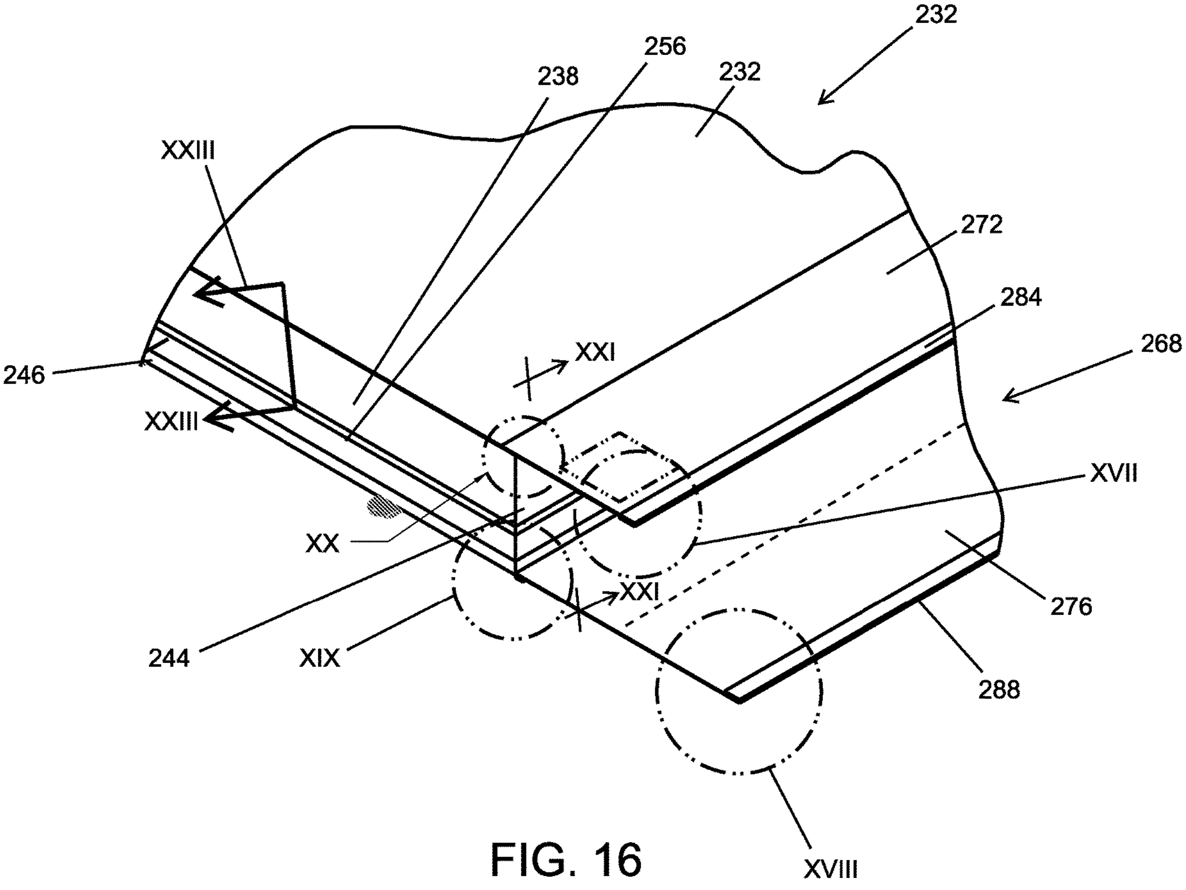
FIG. 16 is a fragmentary perspective view of one end of the cover.

Similar to previous embodiment, to facilitate expansion of the person support surface formed by mattress 14 and cover 230, cover 230 includes one or more bolster sleeves 268 (a partial sleeve is shown in FIG. 16 in its unattached configuration) along one or more of the longitudinal sides of cover 230, which extend from cover 230 and, therefore, together form a mattress cover assembly. Each sleeve 268 is selectively reconfigured between a stowed configuration or state (similar to the previous embodiment as shown in FIG. 3) wherein the sleeve is folded against the longitudinal side of the cover 230, and is closely adjacent the respective longitudinal side of the main cushion (15), and an expanded configuration or state wherein the sleeve forms an extension of the top surface of the cover 230 and the main cushion (15) when a bolster cushion insert is inserted in the sleeve to thereby increase the support surface of the mattress.

In the illustrated embodiment, each sleeve 268 is formed by bolster cover portions 270, 272, 274, and 276, which are formed by left and right (as viewed in FIG. 11) extensions of upper cover portion 232 and left and right extensions of lower cover portion 234 that extend beyond the respective perimeter walls (formed by end panels 238, 240, and 246, 248 and side panels 242, 244 and 250, 252). Alternately, one or both upper and lower bolster cover portions 270, 272, 274, and 276 may be formed by panels that are joined with upper cover portion 232 and lower cover portion 234 so that extend beyond the respective perimeter walls. In the illustrated embodiment, upper bolster cover portions 270, 272 are formed by left and right (as viewed in FIG. 11) extensions of upper cover portion 232, while lower bolster cover portions 274, 276 are formed from panels that extends from lower cover portion 234 (see FIG. 19).

Optionally, each extension or panel of material that form by bolster cover portions 270, 272, 274, and 276 may include a panel 294, 296 of fire retardant material, such as a fire retardant non-woven panel, and an optional inside panel 273, which may be formed from the same material as the upper panel of upper cover portion 232.

In the illustrated embodiment, each bolster cover portion 270, 272, 274, and 276 extends the full length of each longitudinal side of the mattress (or cover). Alternately, as noted, the bolster cover portions 270, 272, 274, and 276 may be formed from panels attached to the upper and lower cover portions.

In another embodiment, one or more of the bolster cover portions 270, 272, 274, and/or 276 extend only along a portion of the respective longitudinal side. However, in order to reduce seams and pathways for potential liquid intrusion, it may be advantageous to make the sleeves to extend the full length of the cover and/or form the bolster cover portions from extensions of the upper cover portion (232), as noted above, and thereby eliminate at least two seams.

Similar to the previous embodiment, the edges of the bolster cover portions 270*a*, 272*a*, 274*a*, and 276*a* each have a zipper half 282, 284, 286, 288 mounted thereto, such as by stitching. Additionally, the downwardly facing side 234*a* (as viewed in FIG. 11) of lower cover portion 234 includes two spaced apart zipper halves 290, 292 that are located at the opposed edges of the main mattress (15), and which are generally at the juncture of the lower bolster cover portions 274, 276 and side panels 250, 252.

In this manner, when zipper halves 282 and 286 are joined together and when zipper halves 284 and 288 are joined together, the bolster cover portions 270, 274 and 272, 276 create the respective sleeves 268 for insertion of the bolster cushion inserts.

On the other hand, when zipper halves 282, 286 and 284, 288 are released or disconnected, and the bolster cushion inserts are removed, lower bolster cover portions 274 and 276 can be folded against the longitudinal sides of the main cushion, and the zipper halves of upper bolster cover portions 270 and 272 can then be connected to the zipper halves 290 and 292 secured to lower cover portion 234, thereby containing the folded lower bolster cover portions 274, 276 against the sides of the main cushion.

Optionally the underside of upper bolster may include a fire retardant material 294, 296, such as a fire retardant non-woven panel, secured thereto by a seam, formed for example, by stitching.

As noted above, when in their expanded configuration, sleeves 268 are optionally filled with a cushion insert, such as a foam insert or an inflatable insert. Thus, when filled or inflated, the support surface is extended beyond the perimeter of the core of the mattress to provide an extended support surface for a portion of a person's body that may exceed or go beyond a conventional mattress, for example, in the case of a bariatric person. Optionally, the sleeves may be sized and shaped so that the extended support surface is higher than the support surface of the main cushion to form a barrier on either side of the mattress, which can help with reducing falls from the mattress.

To deploy sleeves 268 from their stowed positions, the lower edges of upper bolster cover portions 270, 272 are released (e.g., such as by unzipping zipper halves 282, 284 from zipper halves 290, 292, "the stowed connection zipper"). Thereafter, lower bolster cover portions 274, 276 can be unfolded and then secured at their free edges via zipper halves 286, 288 to the lower edges (now free lower edge) of upper bolster cover portions 270, 272, for example, by zipper halves 282, 284, which is referred to as the "deployed connection fastener or zipper". In this manner, the upper and lower bolster cover portions can then be joined together at their respective free edges. In this manner, upper bolster cover portions 270, 272 and lower bolster cover portions 274, 276 form together the sleeves (268) into which the cushioning material, such as a cushion insert (e.g. insert 50 described above), can be inserted. As noted above, this cushioning material may be a similar cushioning material that forms or forms a part of the main cushion (15), or may be fluid, such as air or a combination of both.

As noted above, cushion insert 50 may be formed from a single layer of cushion or cushioning material or multiple layers of cushion (see FIG. 6). Optionally, cushion insert 50 may be formed from the same material as or different material than the main cushion. In the first illustrated embodiment, cushion insert 50 is formed from multiple layers of cushion 50a, 50b, 50c, such as foam, joined together, such as by an adhesive. Alternately or in addition, layers 50a, 50b, and 50c can be held together by a sleeve 50d.

As described above, cover 230 may be configured to have reduced pathways for liquid intrusion. To achieve the reduced pathways, cover 230 is assembled from panels of material, as described above, which are joined together by stitching and, further, by stitching several of the panels inside out and then turning them right side out or the unfolding the panels so that the seams formed by the stitching are inward of the outer footprint of the cover or internal to the cover.

Figure 17:
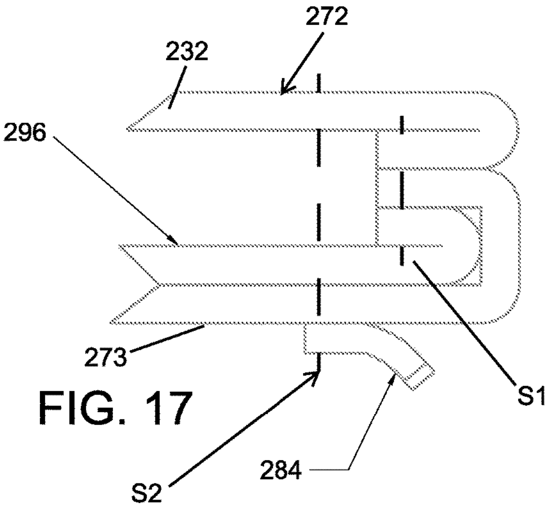
FIG. 17 is an enlarged detail view of section XVII of FIG. 16.

As best seen in FIG. 17, the panels of material forming the upper bolster cover portion 272, namely the panels of material that forms upper cover portion 232 and the extension thereof, the panel of fire retardant material 296, and the inside panel 273, may be stitched together with a seam S1 while inside out and then folded right side out. Zipper 284 is then sewn onto the stitched panel by a seam S2, which seam S2 is located inward (toward the center of the cover) of seam S1. With this construction, both seams S1 and S2 are inward of the edge of the stitched assembly (upper bolter cover portion 272). Similar construction may be used on upper bolster cover portion 270.

Figure 18:
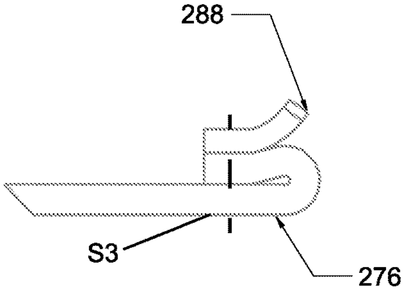
FIG. 18 is an enlarged detail view of section XVIII of FIG. 16.
Figure 19:
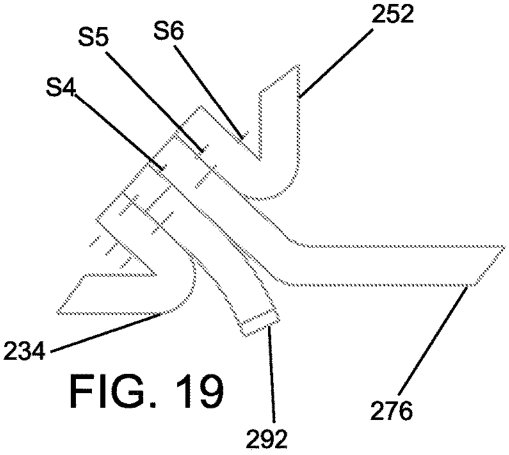
FIG. 19 is an enlarged detail view of section XIX of FIG. 16.

As best seen in FIG. 18, the panel of material forming the lower bolster cover portion 276 is folded over at its distal or outer end to form its outer edge and then stitched with a seam S3 to zipper half 288. The other end of the panel forming lower bolster cover portion 276 is stitched by a seam S4 to zipper half 292 and a folded-in edge of the panel of material forming lower cover portion 234. Referring to FIG. 19, the other end of the panel forming lower bolster cover portion 276 is also stitched by a seam S5 that extends into a folded-in edge of the panel of material forming side panel 252 as well as zipper half 292 and a folded-in edge of the panel of material forming lower cover portion 234. A third seam S6 is then provided through all the layers-namely, the folded-in edge of the panel of material forming side panel 252, zipper half 292, and the folded-in edge of the panel of material forming lower cover portion 234. The panels forming side panel 252 and lower cover portion 234 are then unfolded so that all three seams (S4, S5, and S6) are inward of the outer edge of that connection and, hence, internal to cover 230.

Figure 20:
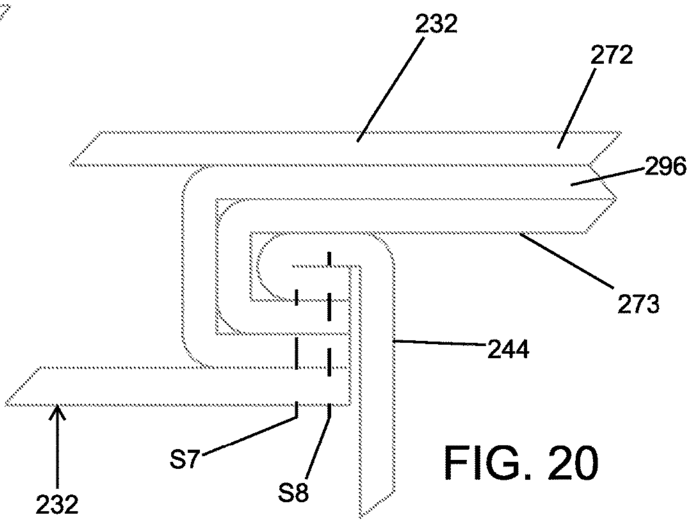
FIG. 20 is an enlarged detail view of section XX of FIG. 16.

As best seen in FIG. 20, the other end of the panel forming upper bolster cover portion 272 is also stitched by multiple internal seams. The upper edge of side panel 244 is first stitched by seam S7 to the edges of inside panel 273, fire retardant panel 296, and the inside panel 232a. The edge of side panel 244 is then folded over with another seam S8 stitched through all the edges of the panels (273, 296, 232a) and through the folded edge of side panel 244. Inside panel 273 and fire retardant panel 296 are then folded over the seams S7 and S8 so again the seams are inward of the edge of the joint and, therefore, internal to the cover.

Referring to FIGS. 21 and 22, the seams for flap 256 are also internal to the cover. As best seen in FIG. 22, the folded panel of material forming flap 256 along the side of the cover where there is a zipper (238) is position between the lower edge of side panel 244 and upper edge of an extension panel 245 of side panel 244 that extends downwardly and is joined with upwardly extending side panel 252 of lower cover portion 234. The folded panel of material forming flap 256 is joined to the lower edge of side panel 244 and upper edge of extension panel 245 by a seam S9 formed by stiches that do not pass through panels 244 and 245. A second seam S10 formed by stitching that extends through three of the four layers of panels (panel 245 and the flap). A third seam S11, formed by stitching, is then provided that extends through all four layers of panels. A strip of binding 298 is then extended over the edges of the panels and seams S9, S10, and S11 and then sewn by stitches forming a fourth seam S12 that extends through all four layers of the panels 244 and 245 and fold 256. Again, these seams are all formed when the material is turned inside out. Once the cover is folded right side out, it results in the seams being inward of the outer edges of the cover—in other words, being internal to the cover.

The seams under the flap are protected from liquid intrusion by the flap 256. Regardless, the upper end of side panel 252 is first sewn by a seam S13 to the lower end of extension panel 245 and then folded back on itself over seam S13 and then secured in place by another seam S14.

As best seen in FIG. 22, the panel of material forming flap 256 along the end of the cover where there is no zipper in cover 230 is positioned between the lower edge of end panel 238 and upper edge of end panel 246 and secured therein by multiple seams S15, S16, S17, and S18 and binding 298 in a similar manner as described above in reference with seams S9, S10, S11, and S12.

While described in reference to one side and one end of the cover or one upper and one lower bolter portion, it should be understood that the details of their construction applies to the other end, side and bolster cover portions.

Optionally, cover 230 may include straps attached thereto, e.g. by stitching, including reinforcing patches, to form handles 300 or pull straps 302 with or without buckles. The location may vary, but in the illustrated embodiment are provided on lower cover portion 234 inward of the cover sides and end.

Although described herein in reference to a mattress, it should be understood that the cover and sleeves described herein may be used in connection with other types of cushions. Further, although not illustrated, the length of the mattress and the cover may be similarly extended by locating one or more sleeves at the head end and/or foot end of the main cushion. Additionally, the sleeve or sleeves may extend only partially along the longitudinal length of the main cushion.

As noted above, one or more components of the cushion insert may also be inflatable. Alternately, the bolster sleeve may be inflated with a fluid, such as air. For example, a suitable supply of air may be provided by an air supply system on the person support apparatus, such as disclosed in U.S. Pat. No. 8,011,039 (P106A), issued on Sep. 6, 2011, which is commonly owned by Stryker Corporation and which is incorporated by reference herein in its entirety.

As noted, although described as using zippers, Velcro strips and/or snaps, other fasteners may be used to secure the various components, such as upper and lower portions of the bolster cover together. Further, the location of the fasteners may vary.

Directional terms, such as "left", "right", "vertical," "horizontal," "top," "bottom," "upper," "lower," "inner," "inwardly," "outer" and "outwardly," are used to assist in describing the embodiments based on the orientation of the embodiments shown in the illustrations. The use of directional terms should not be interpreted to limit the disclosure to any specific orientation(s).

The above description is that of current embodiments of the disclosure. Various alterations and changes can be made without departing from the spirit and broader aspects of the disclosure as defined in the appended claims, which are to be interpreted in accordance with the principles of patent law including the doctrine of equivalents. This disclosure is presented for illustrative purposes and should not be interpreted as an exhaustive description of all embodiments of the disclosure or to limit the scope of the claims to the specific elements illustrated or described in connection with these embodiments. For example, and without limitation, any individual element(s) of the described embodiments may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present disclosure is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The invention claimed is:

1. A support apparatus for a person, said support apparatus comprising:

a main cushion, said main cushion including a bottom surface, a top surface for facing the person supported on said main cushion for forming at least a first portion of an exterior upper support surface of the support apparatus, a width, and a length, said main cushion having a perimeter, longitudinal sides, and lateral sides, said longitudinal and lateral sides extending around said perimeter; and a stowable surface, said stowable surface located along one side of said sides of said main cushion, said stowable surface being reconfigurable between a stowed state and a deployed state, wherein, in said deployed state, said stowable surface extends from said stowed state to form a space and to form an extension of said top surface of said main cushion, wherein said extension forms at least a second portion of said exterior upper support surface such that said extension formed by said stowable surface increases a width or a length of said exterior upper support surface, wherein said space is configured to receive a cushion insert.

2. The support apparatus of claim 1 comprising a sleeve including said stowable surface.

3. The support apparatus of claim 2 comprising the cushion insert having an upper support surface, wherein said sleeve is configured to open to receive said cushion insert and to close to contain said cushion insert in said space and aligns said upper support surface of said cushion insert with said upper support surface of said main cushion.

4. The support apparatus of claim 2 wherein:

said sleeve is reconfigurable between said stowed state and said deployed state;

said sleeve includes first and second sleeve portions; and in said stowed state, said first sleeve portion is directly folded against said one side of said main cushion and said first sleeve portion is directly folded against said second sleeve portion.

5. The support apparatus of claim 4 wherein said first sleeve portion is an upper cover portion and said second sleeve portion is a lower cover portion.

6. The support apparatus of claim 2 wherein said sleeve includes an interior surface opposed by said stowable surface of said sleeve, and wherein, in said stowed state, said interior surface is directly folded against said main cushion and said stowable surface is directly folded against itself.

7. The support apparatus of claim 2 comprising an air supply system in communication with said sleeve to inflate said sleeve.

8. The support apparatus of claim 2 wherein said sleeve is configured with a low friction inner surface to slidably receive a cushion insert therein.

9. The support apparatus of claim 8 wherein said sleeve is configured with a high friction surface at one end thereof to retain said cushion insert in said sleeve.

10. The support apparatus of claim 1 wherein said stowable surface extends substantially along a full length of said one side of said sides of said main cushion.

11. The support apparatus of claim 1 wherein said stowable surface includes an upper end and a lower end, said upper end secured at said top surface of said main cushion, and said lower end secured at said bottom surface of said main cushion.

12. The support apparatus of claim 1 wherein said stowable surface is retained in said stowed state by a releasable fastener, wherein said releasable fastener includes at least one of a zipper, hook and loop fasteners, or snaps.

13. The support apparatus of claim 1 wherein said main cushion is formed from a first cushioning material, and wherein said cushion insert is formed from a second cushioning material that is the same or similar to said first cushioning material of said main cushion.

14. The support apparatus of claim 13 wherein said first cushioning material and said second cushioning material each comprise foam.

15. The support apparatus of claim 13 wherein said first cushioning material has a first ILD, and said second cushioning material has a second ILD greater than said first ILD.

16. The support apparatus of claim 1 wherein said stowable surface is formed by a first sheet of material and a second sheet of material, said first sheet having an upper end or edge and a lower end or edge, said upper end or edge of said first sheet of material being secured to said main cushion at said top surface of said main cushion, said lower end or edge of said first sheet is releasably secured by a releasable fastener to said main cushion at said bottom surface of said main cushion, and said first sheet of material releasably joinable with said second sheet of material by a releasable fastener when said first sheet is released from said main cushion at said bottom surface.

17. The support apparatus of claim 16 wherein at least one of said releasable fasteners comprises a zipper.

18. The support apparatus of claim 1 wherein said stowable surface is formed from an elastic material, wherein said stowable surface stretches from said stowed state to said deployed state.

19. The support apparatus of claim 1 wherein, when in said deployed state, said stowable surface has a size, and further comprising an adjustment assembly including a band arranged to adjust said size of said stowable surface when in said deployed state.

20. The support apparatus of claim 19 wherein said adjustment assembly comprises one or more straps to adjust said size of said stowable surface.

21. The support apparatus of claim 1 wherein said main cushion includes a cover, and said stowable surface is joined with said cover, said cover being formed from a cover material, and said stowable surface being formed at least partially from a surface material either the same or similar to said cover material.

22. The support apparatus of claim 1 wherein said main cushion includes a cover, and said stowable surface is joined with said cover, said cover being formed from a cover material, and said stowable surface being formed at least partially from a surface material different than said cover material.

23. A support apparatus for a person, said support apparatus comprising:

a main cushion, said main cushion including a bottom surface, a top surface for facing the person supported on said main cushion for forming at least a first portion of an upper support surface of said support apparatus, a width, and a length, said main cushion having a perimeter, longitudinal sides, and lateral sides, said longitudinal and lateral sides extending around said perimeter; and a stowable surface, said stowable surface located substantially along a full length of one side of said sides of said main cushion, said stowable surface being reconfigurable between a stowed state and a deployed state, wherein, in said deployed state, said stowable surface extends from said stowed state to form a space and to form an extension of said top surface of said main cushion, wherein said extension forms at least a second portion of said upper support surface such that said extension formed by said stowable surface increases a width or a length of said upper support surface, wherein said upper support surface is an exterior upper support surface of said support apparatus, and wherein said extension of said stowable surface is an exterior surface of said support apparatus that forms said second portion of said exterior upper support surface.

24. The support apparatus of claim 23 comprising a sleeve including the stowable surface.

25. The support apparatus of claim 24 comprising a cushion insert having an upper support surface, wherein said sleeve is configured to open to receive said cushion insert and to close to contain said cushion insert in said space and aligns said upper support surface of said cushion insert with said upper support surface of said main cushion.

26. The support apparatus of claim 24 wherein:

said sleeve is reconfigurable between said stowed state and said deployed state;

said sleeve includes first and second sleeve portions; and in said stowed state, said first sleeve portion is directly folded against said one side of said main cushion and said first sleeve portion is directly folded against said second sleeve portion.

27. The support apparatus of claim 26 wherein said first sleeve portion is an upper cover portion and said second sleeve portion is a lower cover portion.

28. The support apparatus of claim 24 wherein said sleeve includes an interior surface opposed by said stowable surface of said sleeve, and wherein, in said stowed state, said interior surface is directly folded against said main cushion and said stowable surface is directly folded against itself.

29. The support apparatus of claim 24 comprising an air supply system in communication with said sleeve to inflate said sleeve.

30. The support apparatus of claim 24 wherein said sleeve is configured with a low friction inner surface to slidably receive a cushion insert therein.

31. The support apparatus of claim 30 wherein said sleeve is configured with a high friction surface at one end thereof to retain said cushion insert in said sleeve.

32. The support apparatus of claim 23 wherein said space is configured to receive a cushion insert.

33. The support apparatus of claim 32 wherein said main cushion is formed from a first cushioning material, and wherein said cushion insert is formed from a second cushioning material that is the same or similar to said first cushioning material of said main cushion.

34. The support apparatus of claim 33 wherein said first cushioning material and said second cushioning material each comprise foam.

35. The support apparatus of claim 33 wherein said first cushioning material has a first ILD, and said second cushioning material has a second ILD greater than said first ILD.

36. The support apparatus of claim 23 wherein said stowable surface is formed by a first sheet of material and a second sheet of material, said first sheet having an upper end or edge and a lower end or edge, said upper end or edge of said first sheet of material being secured to said main cushion at said top surface of said main cushion, said lower end or edge of said first sheet is releasably secured by a releasable fastener to said main cushion at said bottom surface of said main cushion, and said first sheet of material releasably joinable with said second sheet of material by a releasable fastener when said first sheet is released from said main cushion at said bottom surface.

37. The support apparatus of claim 36 wherein at least one of said releasable fasteners comprises a zipper.

38. The support apparatus of claim 23 wherein said stowable surface is formed from an elastic material, wherein said stowable surface stretches from said stowed state to said deployed state.

39. The support apparatus of claim 23 wherein, when in said deployed state, said stowable surface has a size, and further comprising an adjustment assembly including a band arranged to adjust said size of said stowable surface when in said deployed state.

40. The support apparatus of claim 39 wherein said adjustment assembly comprises one or more straps to adjust said size of said stowable surface.

41. A support apparatus for a person, said support apparatus comprising:

a main cushion, said main cushion including a bottom surface, a top surface for facing the person supported on said main cushion for forming at least a first portion of an exterior upper support surface of the support apparatus, a width, and a length, said main cushion having a perimeter, longitudinal sides, and lateral sides, said longitudinal and lateral sides extending around said perimeter; and a stowable surface, said stowable surface located along one side of said sides of said main cushion, said stowable surface being reconfigurable between a stowed state and a deployed state, wherein, in said deployed state, said stowable surface extends from said stowed state to form a space and to form an extension of said top surface of said main cushion, wherein said extension formed by said stowable surface in said deployed state includes an outer perimeter edge that is spaced apart from said perimeter of said main cushion, wherein, in transitioning from the deployed state to said stowed state, said outer perimeter edge is moved downward from the top surface into close proximity to said bottom surface of said main cushion and said one side of said main cushion, wherein said extension forms at least a second portion of said exterior upper support surface such that said extension formed by said stowable surface increases at least one of a width or a length of said exterior upper support surface.

* * * * *